United States Patent
Farmer et al.

(10) Patent No.: US 10,544,543 B2
(45) Date of Patent: Jan. 28, 2020

(54) GARMENT INCORPORATING AQUEOUS POLYURETHANE DISPERSIONS HAVING ALTERED STRESS PROFILE

(71) Applicant: INVISTA NORTH AMERICA S.A. R.L., Wilmington, DE (US)

(72) Inventors: Douglas K Farmer, Greensboro, NC (US); Carmen A Covelli, Chadds Ford, PA (US); Hong Liu, Waynesboro, VA (US)

(73) Assignee: The LYCRA Company LLC, Wilmington, DE (US)

( * ) Notice: Subject to any disclaimer, the term of this patent is extended or adjusted under 35 U.S.C. 154(b) by 62 days.

(21) Appl. No.: 15/496,432

(22) Filed: Apr. 25, 2017

(65) Prior Publication Data

US 2017/0226691 A1 Aug. 10, 2017

Related U.S. Application Data

(60) Continuation-in-part of application No. 15/161,749, filed on May 23, 2016, which is a division of (Continued)

(51) Int. Cl.
| | |
|---|---|
| *D06M 15/564* | (2006.01) |
| *C08G 18/12* | (2006.01) |
| *C09D 175/04* | (2006.01) |
| *A41D 7/00* | (2006.01) |
| *A41C 3/00* | (2006.01) |
| *A41C 1/00* | (2006.01) |
| *A41C 1/08* | (2006.01) |

(52) U.S. Cl.
CPC ............ *D06M 15/564* (2013.01); *A41C 1/003* (2013.01); *A41C 1/08* (2013.01); *A41C 3/0007* (2013.01); *A41C 3/0057* (2013.01); *A41D 7/00* (2013.01); *C08G 18/12* (2013.01); *C09D 175/04* (2013.01)

(58) Field of Classification Search
CPC ......... A41C 1/003; A41C 1/08; A41C 3/0007; A41C 3/0057; A41D 7/00; C08G 18/12; C09D 175/04; D06M 15/564
See application file for complete search history.

(56) References Cited

U.S. PATENT DOCUMENTS

| | | | |
|---|---|---|---|
| 4,701,964 A | 10/1987 | Prunesti et al. | |
| 4,826,894 A | 5/1989 | Markusch et al. | |
| (Continued) | | | |

FOREIGN PATENT DOCUMENTS

| | | | | |
|---|---|---|---|---|
| JP | 17290613 | 10/2005 | | |
| WO | WO-02074826 A1 * | 9/2002 | ............. | C08G 18/10 |

OTHER PUBLICATIONS

Siggia, S., "Quantitative Organic Analysis via Functional Group", 3rd Edition, Wiley & Sons, New York, 1963, pp. 559-563.
(Continued)

*Primary Examiner* — Arti Singh-Pandey
(74) *Attorney, Agent, or Firm* — Bridget C. Sciamanna; Kathleen A. Tyrrell

(57) ABSTRACT

Articles, such as garments, including films comprising dried aqueous polyurethane dispersions are disclosed, whereby the garment has an altered stress which is exhibited during wear of the garment. The film may be bonded to the fabric of the article to provide a fabric or film laminate.

33 Claims, 12 Drawing Sheets

Related U.S. Application Data application No. 12/354,030, filed on Jan. 15, 2009, now abandoned.

(60) Provisional application No. 61/021,241, filed on Jan. 15, 2008, provisional application No. 62/376,003, filed on Aug. 17, 2016.

(56) References Cited

U.S. PATENT DOCUMENTS

| | | |
|---|---|---|
| 5,162,481 A | 11/1992 | Reid et al. |
| 5,391,343 A | 2/1995 | Dreibelbis et al. |
| 5,447,462 A | 9/1995 | Smith et al. |
| 5,461,122 A | 10/1995 | Yilgor et al. |
| 5,626,960 A | 5/1997 | Carney |
| 5,660,577 A | 8/1997 | Modena |
| 5,879,596 A | 3/1999 | Roach |
| 5,916,829 A | 8/1999 | Girard |
| 6,000,994 A | 12/1999 | Salotto |
| 6,203,901 B1 | 3/2001 | Kosinski et al. |
| 6,238,266 B1 | 5/2001 | Vogt |
| 6,287,168 B1 | 9/2001 | Rabinowicz |
| 6,645,040 B2 | 11/2003 | Rabinowicz et al. |
| 6,837,771 B2 | 1/2005 | Falla |
| 6,966,815 B2 | 11/2005 | Weinerth |
| 7,192,332 B2 | 3/2007 | Liu |
| 7,240,371 B2 | 7/2007 | Liu et al. |
| 7,300,331 B2 | 11/2007 | Baran et al. |
| 7,425,516 B2 | 9/2008 | Kocher et al. |
| 7,563,152 B2 | 7/2009 | Liu |
| 7,682,219 B2 | 3/2010 | Falla |
| 7,749,207 B2 | 7/2010 | Rossi et al. |
| 8,058,343 B2 | 11/2011 | Liu et al. |
| 2006/0183849 A1* | 8/2006 | Liu .................... C08G 18/0823 524/589 |
| 2007/0082579 A1 | 4/2007 | Baran et al. |
| 2007/0213457 A1 | 9/2007 | Liu et al. |
| 2007/0232773 A1* | 10/2007 | Endo .................. C08G 18/0823 528/44 |
| 2008/0153388 A1 | 6/2008 | Liu |
| 2009/0181599 A1 | 7/2009 | Farmer et al. |
| 2009/0247658 A1* | 10/2009 | Kobayashi ............. C08G 18/10 521/159 |
| 2016/0286879 A1 | 10/2016 | Farmer et al. |

OTHER PUBLICATIONS

Walter et al., "Solving Common Coating Flaws in Reverse Roll Coating", Converting Magazine, National Starch & Chemical Company, Delivered at AIMCAL, Oct. 2003, 4 pages.

* cited by examiner

GARMENT INCORPORATING AQUEOUS POLYURETHANE DISPERSIONS HAVING ALTERED STRESS PROFILE

CROSS-REFERENCE TO RELATED APPLICATIONS

This application claims the benefit of U.S. Provisional Application No. 62/376,003 filed on Aug. 17, 2016, and is a continuation-in-part of U.S. application Ser. No. 15/161,749, filed on May 23, 2016, which claims the benefit of U.S. Provisional Application No. 61/021,241 filed on Jan. 15, 2008. The entire contents of the aforementioned applications are incorporated by reference herein.

BACKGROUND OF THE INVENTION

Field of the Invention

The present invention relates to garments including body shaping garments and performance enhancing garments that include an altered stress profile. The garment includes one or more layers of material such as fabric and/or polyurethane foam in combination with an aqueous dispersion.

Summary of Related Technology

Garments provide a variety of different functions including, but not limited to, warmth, fashion, and comfort. Two goals of body shaping garments include support and comfort either of which can be compromised due to the other. One reason for reduction in comfort is that garments designed for body-shaping or support frequently have areas where increased pressure is exerted on the wearer of the garment.

The areas of increased pressure can result in discomfort to the wearer. Therefore, there is a need for garments that overcome these deficiencies by redistributing the pressure by altering the stress profile of the garment, including providing additional support where desired, and providing greater comfort to the wearer.

Another issue experienced by body-shaping garments, such as laminated foam garments, is fabric growth. This is particularly an issue with one-piece laminated foam brassieres. There is a need to provide a method of redistributing or controlling stress within the garment to prevent fabric growth.

SUMMARY OF THE INVENTION

A garment is disclosed herein including: one or more sections of fabric, wherein each section of fabric has a stress profile; and one or more films adhered to one or more sections of fabric to form a fabric laminate having an altered stress profile. Each film comprises a dried aqueous polyurethane dispersion comprising a prepolymer and the prepolymer comprises: a glycol, an aliphatic diisocyanate and a diol. A ratio of isocyanate groups in the aliphatic diisocyanate to hydroxy groups in the glycol and the diol (NCO/OH) is about 1.30 to about 2.20. The aliphatic diisocyanate may be 4,4'-methylene bis (cyclohexyl isocyanate); the glycol may be a poly(tetramethylene ether) glycol; and the diol may be DMPA. In an embodiment, a concentration range of carboxylic acid groups in milliequivalent per kg of prepolymer (Meq Acid/kg CG) is about 140 to about 250.

In certain embodiments, the garment may be a brassiere, bralette, swimwear, active wear or a shaper. For example, the film may extend across a bust, belly, thigh, seat, or any combination thereof of the garment, or across the wing portion of the brassiere or bralette.

The fabric laminate having an altered stress profile also may exhibit improved tensile strength, whiteness retention and/or chlorine resistance.

Methods of preparing garments including an altered stress profile are also included.

Another embodiment is a bust supporting garment comprising: a material defining a breast cup including a lower periphery and a side periphery that extends from said lower periphery to a top portion of the breast cup where a strap is optionally attached, and a winged portion; and a film adhered to at least a portion of the material. The film comprises a dried aqueous polyurethane dispersion including a prepolymer, and the prepolymer comprises: a glycol, an aliphatic diisocyanate and a diol. A ratio of isocyanate groups in the aliphatic diisocyanate to hydroxy groups in the glycol and the diol (NCO/OH) is about 1.30 to about 2.20. The film may be adhered to the material at the lower and/or side peripheries of the breast cups, the wing portions, and/or the straps of the garment. The bust supporting garment may be a brassiere, bralette or sports bra.

DETAILED DESCRIPTION OF THE INVENTION

Figure 1:
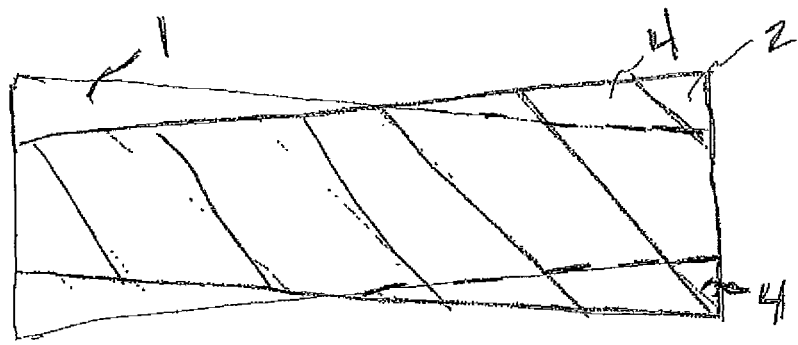
FIG. 1 shows a portion of fabric including a geometrically inverted film of dried aqueous dispersion.

A garment is disclosed herein wherein a film is adhered to one or more sections of fabric to form a fabric laminate having an altered stress profile.

The term "film" is used herein to describe a layer (or layers) having a length and width of dried aqueous polyurethane dispersion, that may or may not require application to a substrate for support. The film may be continuous or discontinuous, shaped or free-formed. In an embodiment, the film may be substantially two-dimensional and/or relatively flat.

The term "fabric laminate" refers to an article or garment including at least one fabric layer and at least one film layer that have been attached or bonded together. The methods of attachment include, but are not limited to, gluing, heating, application of pressure, padding, coating, printing, bonding, laminating or other treatment methods, and then may be cured (or dried) with a residence time of about 1 to about 5 minutes. Upon drying, such an article or garment exhibits higher stretch and recovery, improved chlorine resistance, and improved whiteness retention, among other benefits.

The term "stress profile" as used herein refers to a physical pressure, pull, or other force that is exerted on a fabric accounting for various different forces that can be measured at various points throughout the garment. The stress profile can be observed in any fabric such as a fabric used in a garment. One example of a stress profile of a fabric is noted for body shaping garments where the stress or pressure exerted on the garment will vary as the garment is being worn due to wearer movement. Another example is for a support garment such as a brassiere where the stress on the bottom of the breast cup portions may be greater than that on the top of the breast cup portions. The stress profile may be quantitatively measured, for example, by calculating tensile strength and associated properties.

As used herein, the term "modulus", also known as the elastic modulus, is a measure of the stiffness of a fabric.

The term "geometrically inverted" is meant to include embodiments where a film of the same geometric shape as the fabric with which it will be laminated has been rotated with respect to the fabric. The film may be larger, smaller, or the same size as the fabric section. This also includes, but is not limited to, where film and fabric of size and dimension are designed inversely proportionate to the modulus of the film and fabric, respectively.

As used herein, the term "non-linear" includes shapes other than a straight line. This includes, but is not limited to, curved shapes, arc shapes, and wavy shapes.

As used herein, the term "narrow strip" refers to a shape having a length and a width where the length is at least twice the width. The length may vary and depends on the size of the garment to which it is applied.

As used herein, the term "porous" refers to a substrate that includes voids or holes in the surface or at any point within or through the thickness of the substrate or to any material of which the articles of the present invention may come into contact.

As used herein, the term "pressing" or "pressed" refers to an article that has been subjected to heat and/or pressure to provide a substantially planar structure.

As used herein, the term "foam" refers to any suitable foam that may be used in fabric construction such as polyurethane foam.

As used herein, the term "dispersion" refers to a system in which the disperse phase consists of finely divided particles. A continuous phase can be a liquid, solid or gas.

As used herein, the term "aqueous polyurethane dispersion" refers to a composition containing at least a polyurethane or polyurethane urea polymer or prepolymer (such as the polyurethane prepolymer described herein), optionally including a solvent, that has been dispersed in an aqueous medium, such as water, including de-ionized water.

A dried aqueous polyurethane dispersion, as used herein, is an aqueous polyurethane dispersion that has been subjected to curing or drying by any suitable method. The dried aqueous polyurethane dispersion may be in the form of a shaped article, e.g., a film.

As used herein, the term "solvent," unless otherwise indicated, refers to a non-aqueous medium, wherein the non-aqueous medium includes organic solvents, including volatile organic solvents (such as acetone) and somewhat less volatile organic solvents (such as MEK, or NMP).

As used herein, the term "solvent-free" or "solvent-free system" refers to a composition or dispersion wherein the bulk of the composition or dispersed components has not been dissolved or dispersed in a solvent.

As used herein, the term "article" refers to a formed substrate or textile fabric. The article may be a garment. The article may comprise a dried aqueous polyurethane dispersion, which may be in the form of a shaped article, and a substrate, for example a textile fabric, which may or may not have at least one elastic property, in part, due to the application of the aqueous polyurethane dispersion or shaped article as described herein. The article may be in any suitable configuration such as one-dimensional, two-dimensional and/or three-dimensional.

As used herein, the term "shaped article" may refer to one of a number of objects including for example, film, tape, dots, webs, stripes, bead, and foam. In an embodiment, the shaped article is a film. A film may describe a sheet material of any shape. A tape may describe a film in narrow strip form. A film may be in the form of a tape. The shaped article is a layer comprising an aqueous polyurethane dispersion containing the polyurethane prepolymer described herein, which may be dried, and may be applied to a substrate or release paper, which can be used for adhesion and/or to form a rigid or an elastic article.

As used herein, the term "fabric" or "textile fabric" refers to a knitted, woven or nonwoven material. The knitted fabric may be flat knit, circular knit, warp knit, narrow elastic, and lace. The woven fabric may be of any construction, for example sateen, twill, plain weave, oxford weave, basket weave, and narrow elastic. The nonwoven material may be meltblown, spun bonded, wet-laid, carded fiber-based staple webs, and the like. Fabrics suitable for use herein include but are not limited to cotton, wool, acrylic, polyamide (nylon), polyester, spandex, regenerated cellulose, rubber (natural or synthetic), bamboo, silk, soy or combinations thereof.

As used herein, the term "substrate" refers to any material to which a shaped article or aqueous polyurethane dispersion can be applied. A substrate may be substantially one dimensional as in a fiber, two dimensional as in a planar sheet, or a three dimensional article or a bumpy sheet. A planar sheet for example may comprise textile fabric, paper, flocked article, and/or web. A three dimensional article for example may comprise leather and/or foam. Other substrates may comprise wood, paper, plastic, metal, and composites such as concrete, asphalt, gymnasium flooring, and plastic chips.

As used herein, the term "hard yarn" refers to a yarn which is substantially non-elastic.

As used herein, the term "molded" article refers to a result by which the shape of an article or shaped article is changed in response to application of heat and/or pressure.

As used herein, the term "derived from" refers to forming a substance out of another object. For example, a film may be derived from a aqueous dispersion which can be dried.

As used herein, the term "modulus" refers to a ratio of the stress on an item expressed in force per unit linear density or area.

As used herein, the term "fabric growth" is meant to include the natural tendency of fabrics to stretch over time or during wear that is not recovered (i.e., not elastic).

As used herein, the term "performance-enhancing" in reference to a garment refers to a garment that reduces fatigue or maintains performance-ability of the wearer of the garment. For example, an athlete may wear a performance-enhancing garment during competition to reduce fatigue and/or maintain competitive performance.

In some embodiments, a garment includes a film that alters the stress profile of the garment. This includes equally distributing stress throughout the garment as well as providing a "stress gradient" where additional support is desired. The stress gradient provides areas of preselected stress to redistribute the stress such as from an area of lower stress to an area of greater stress within the fabric of the garment. One example of a stress gradient is useful for a bust supporting garment, such as a brassiere, sports bra or bralette (that is, a brassiere without underwire). The film may be included in a breast cup to provide a stress gradient that provides greater stress for support at the bottom of the breast cup and lower stress at the top of the breast cup. The film may also be applied to a wing portion, strap, and/or bridge of the bust supporting garment. The breast cup is understood to be the portion of the material that, when worn, holds and supports the breast. The breast cup need not contain underwire, seams, padding, lining, foam, panels, or the like defining the area. In certain embodiments, the breast cup may comprise a pair of breast cups that include underwire, seams, padding, lining, foam, panels, or the like. In other embodiments, the breast cup may be a piece of material used in, for example, a simple bralette or sports bra, formed without underwire, seams, padding, lining, foam, panels, or the like defining the area.

An article of the disclosure may include at least one layer of a film such as comprising a dried aqueous polyurethane dispersion on one or more sections of fabric. The articles may have more than one layer of fabric and/or more than one layer of film. The film may provide stretch and recovery, increased elastic modulus, adhesion, moldability, shape retention, and flexibility properties for the article. These articles may be formed into fabrics and/or garments.

The film of the disclosure may optionally be cast from a solution, an aqueous polyurethane dispersion, or a substantially solvent free aqueous dispersion. Specific examples of aqueous polyurethane dispersions and films cast from them which are useful with the present invention are described hereinbelow. Aqueous polyurethane dispersions used herein are made from prepolymers comprising a glycol, an aliphatic diisocyanate and a diol, such as those disclosed in PCT Application titled: Aqueous Polyurethane Dispersions, Prepolymers, and Shaped Articles Made Therefrom, filed on the same day herewith, which is incorporated by reference herein in its entirety.

Glycol components suitable as a starting material for preparing prepolymers disclosed herein include polycarbonates, and polyesters, polycarbonate glycols, polyether glycols, and polyester glycols.

Examples of polyether glycols that can be used include, but are not limited to, those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, preferably a dial or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (Invista) with a functionality of 2, is used in an embodiment.

Examples of polyester glycols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid and dodecanedicarboxylic acid. Example of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyester polyol with a melting temperature of about 5° C. to about 50° C. is used in an embodiment.

Examples of polycarbonate glycols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Example of suitable polyols for preparing the polycarbonate polyols are diethylene glycol, 1,3-propanediol, 1,4-butanediol, 1,5-pentanediol, 1,6-hexanediol, neopentyl glycol, 3-methyl-L5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is used in an embodiment.

In an embodiment, the prepolymer contains at least about 60%, at least about 65%, or at least about 70% of the glycol, based upon total weight of the prepolymer. In another embodiment, the prepolymer contains about 60% to about 85%, about 65% to about 80%, about 68% to about 78%, or about 70% to about 77% of the glycol, based upon total weight of the prepolymer.

Any aliphatic diisocyanate may be used in the disclosure. In an embodiment, the isocyanate is a dicyclohexylmethane diisocyanate, preferably including a mixture of its isomers. An example of a suitable isocyanate component is a dicyclohexylmethane diisocyanate or 4,4'-methylene bis (cyclohexyl isocyanate) ("PICM") such as Vestanate® H12MD1 (Evonik) or Desmodur® W (Covestro).

In an embodiment, the prepolymer contains at least about 10%, at least about 20%, at least about 22%, or at least about 24% of the isocyanate, based upon total weight of the prepolymer. In another embodiment, the prepolymer contains about 15% to about 35%, about 13% to about 32%, about 20% to about 30%, or about 22% to about 27% of the isocyanate, based upon total weight of the prepolymer.

Diols suitable as further starting materials for preparing prepolymers disclosed herein, include at least one diol with two hydroxy groups capable of reacting with the isocyanate and at least one carboxylic acid group capable of forming salt upon neutralization and incapable of reacting with the isocyanate. Examples of diols having a carboxylic acid group include, but are not limited to 2,2-dimethylolpropionic acid (such as DMPA® from GEO Specialty Chemicals and Bis-MPA from Perstorp), 2,2-dimethylobutanoic acid, 2,2-dimethylovaleric acid, and DMPA initiated caprolactones such as CAPA™ HC 1060 (Solvay). In an embodiment, the diol is DMPA.

In an embodiment, the prepolymer may contain at least about 1%, or at least about 2.2%, or at least about 2.4% of the diol, based upon total weight of the prepolymer. In another embodiment, the prepolymer contains about 1.5% to about 3.5%, about 2.0% to about 3.0%, about 2.2% to about 2.8%, or about 2.4% to about 2.5% of the diol, based upon total weight of the prepolymer.

The prepolymer may contain at least about 60% glycol, at least about 10% isocyanate and at least about 1% diol, based upon total weight of the prepolymer. The prepolymer may contain at least about 70% glycol, at least about 20% isocyanate and at least about 2.2% diol, based upon total weight of the prepolymer. The prepolymer may contain about 60% to about 80% glycol, about 15% to about 35% isocyanate, and about 1.5% to about 3.5% diol, based upon total weight of the prepolymer.

In an embodiment, the prepolymer further comprises a monofunctional alcohol, such as but not limited to methanols, ethanols, propanols, butanols and 1-hexanol. The prepolymer may contain less than about 1%, less than about 0.6%, or less than about 0.5% of the monofunctional alcohol, based upon total weight of the prepolymer. In another embodiment, the prepolymer contains about 0.20% to about 0.70%, about 0.25% to about 0.60%, about 0.31% to about 0.55%, or about 0.31% to about 0.51% of the monofunctional alcohol, based upon total weight of the prepolymer.

In an embodiment, the prepolymer further comprises 1-hexanol. The prepolymer may contain less than about 1%, less than about 0.6%, or less than about 0.5% of the 1-hexanol, based upon total weight of the prepolymer. In another embodiment, the prepolymer contains about 0.20% to about 0.70%, about 0.25% to about 0.60%, about 0.31% to about 0.55%, or about 0.31% to about 0.51% of the 1-hexanol, based upon total weight of the prepolymer.

When the prepolymer contains 1-hexanol, it may comprise at least about 60% glycol, at least about 10% isocyanate, at least about 1% diol and less than about 1% 1-hexanol, based upon total weight of the prepolymer. In another embodiment, the prepolymer comprises at least about 70% glycol, at least about 20% isocyanate, at least about 2.2% diol and less than about 0.6% 1-hexanol, based upon total weight of the prepolymer. The prepolymer may contain about 60% to about 80% glycol, about 15% to about 35% isocyanate, about 1.5% to about 3.5% diol and about 0.20% to about 0.70% 1-hexanol, based upon total weight of the prepolymer.

The prepolymer may be formulated to have an NCO/OH ratio, the molar ratio of isocyanate groups to hydroxy groups, of about 1.30 to about 2.20, about 1.30 to about 2.00, about 1.40 to about 1.90, or about 1.50 to about 1.85. The NCO groups are from the isocyanate and the OH groups are from the glycol and the diol. It was found that if the NCO/OH ratio is too low, the prepolymer viscosity will be too high to be dispersed. In addition, a low NCO/OH ratio results in low recovery ability for the films of the dried aqueous polyurethane dispersions disclosed herein. On the other hand, a NCO/OH ratio that is too high causes the films to lose elasticity or stretch elongation.

It is believed that the addition of monol in the prepolymer reduces the viscosity as it limits the molecular weight growth. To make the prepolymer dispersible, lower viscosity is preferred. In an embodiment, the viscosity is below about 3000 poises @40° C., preferably below about 2500 poises @40° C. and more preferably below about 2000 poises @40° C. The viscosity may be between about 3000 to about 500 poises @40° C., about 2500 to about 600 poises @40° C., or about 2000 to about 700 poises @40° C.

The prepolymer may be formulated to have a specific Meq Acid/kg CG, where Meq is the milliequivalent of the specific functional groups, here carboxylic acid, per kg of the prepolymer or capped glycol (CG). The carboxylic acid group is from a diol such as DMPA, which has two hydroxy groups capable of reacting with the diisocyanate and has one carboxylic acid group incapable of reacting with the diisocyanate. The prepolymer may be formulated to have a concentration range of the carboxylic acid groups in milliequivalent per kg of prepolymer from about 140 to about 250, about 150 to about 230, about 150 to about 220, about 155 to about 220, about 170 to about 190, or about 185.

Importantly, the amount of acid in the prepolymer contributes to the viscosity of the prepolymer and the stability of the aqueous dispersion made from the prepolymer. For example, if the concentration of acid is too high, that means the diol concentration will be high, the prepolymer formed will have high viscosity and thus will not properly disperse into water to form an uniform dispersion with small particle sizes. If the concentration of acid is too low, it will not provide adequate hydrophilic sites after the neutralization, and the aqueous dispersion made from the prepolymer will not be stable.

In an embodiment, the prepolymer may be formulated to have an NCO/OH ratio of about 1.30 to about 2.00, or about 1.40 to about 1.90, and an acid concentration range of about 150 to about 220 milliequivalent per kg of prepolymer, about 155 to about 220 milliequivalent per kg of prepolymer, or about 180 to about 190 milliequivalent per kg of prepolymer. It was found that aqueous dispersions made from these prepolymers have good processability and stability, and the films cast from the aqueous dispersions made from these prepolymers have good whiteness retention and elasticity.

The prepolymer can be prepared by mixing the glycol, isocyanate and diol together in one step and by reacting at temperatures of about 50° C. to about 100° C. for adequate time until all hydroxy groups are essentially consumed and a desired % NCO of the isocyanate group is achieved. Alternatively, this prepolymer can be made by charging molten glycol into a reactor at about 55° C. followed by addition of a DMPA solid powder with agitation and circulation until the diol solid particles are dispersed and dissolved in the glycol. Molten isocyanate is then charged into the reactor with continuous agitation and the capping reaction is allowed to take place at about 90° C. for about 240 minutes, still with continuous agitation. The formed viscous prepolymer is then sampled to determine the extent of the reaction by measuring the weight percentage of the isocyanate groups (% NCO) of the prepolymer through a titration method. The theoretical value of the % NCO after the reaction is completed is 2.97 assuming the glycol MW is at 1800. If the determined % NCO value is higher than the theoretical value, the reaction should be allowed to continue until the theoretical value is reached or the % NCO number becomes constant. Once it is determined that the reaction is complete, the prepolymer temperature is maintained between 85° C. and 90° C. Significantly, the prepolymers are essentially solvent free and contain no alkyl ethoxylates or organotin catalysts. Preferred is that the reaction to prepare the prepolymer be carried out in a moisture-free, nitrogen-blanketed atmosphere to avoid side reactions. No organic solvent is added to or mixed with the starting materials before, during or after the reaction. Optionally, a catalyst may be used to facilitate formation of the prepolymer, such as a tin-free catalyst. For example, K-KAT® XK-640 (King Industries Specialty Chemicals) may be used to facilitate formation of the prepolymer.

The prepolymer of the present invention may be used to produce an aqueous polyurethane dispersion. The aqueous polyurethane dispersion may contain about 30% to about 55%, or about 35% to about 45% prepolymer, based upon total weight of the aqueous polyurethane dispersion.

The prepolymer may be added in an amount such that the aqueous polyurethane dispersion contains at least about 25% or at least about 30% glycol, at least about 5%, or at least about 10% isocyanate, and at least about 1% diol, based upon total weight of the aqueous polyurethane dispersion. In another embodiment, the prepolymer may be added in an amount such that the aqueous polyurethane dispersion contains about 25% to about 35% glycol, about 5% to about 15% isocyanate, and about 0.5% to about 1.5% diol, based upon total weight of the aqueous polyurethane dispersion. In a further embodiment, the prepolymer may be added in an amount such that the aqueous polyurethane dispersion contains about 30% glycol, about 10% isocyanate, and about 1% diol, based upon total weight of the aqueous polyurethane dispersion.

The aqueous polyurethane dispersion may further contain one or more of water, a neutralizer, a surfactant, a defoamer, an antioxidant and a thickener. The aqueous polyurethane dispersion may contain water, a neutralizer, a surfactant, a defoamer, an antioxidant and a thickener.

In an embodiment, the prepolymer, containing carboxylic acid groups along the polymer chains, can be dispersed with a high-speed disperser into a de-ionized water medium that comprises: at least one neutralizing agent to form an ionic salt with the acid; at least one surface active agent (ionic and/or non-ionic dispersant or surfactant); and, optionally, at least one diamine chain extension component. Alternatively, the neutralizing agent can be mixed with the prepolymer before being dispersed into the water medium. At least one antifoam and/or defoam agent and at least one rheological modifier can be added to the water medium before, during, or after the prepolymer is dispersed.

The aqueous polyurethane dispersion may contain at least about 50% water, at least about 1% surfactant, at least about 1% thickener, less than about 1% neutralizer, less than about 1% antioxidant, and less than about 1% defoamer, based upon total weight of the aqueous polyurethane dispersion.

Water may be present in about 40% to about 60%, or about 50%, based upon total weight of the aqueous polyurethane dispersion.

Neutralizers used in these dispersions must be capable of converting the acid groups to salt groups. Examples include, but are not limited to tertiary amines (such as triethylamine (TEA), N,N-diethylmethylamine, N-methylmorpholine, N,N-diisopropylethylamine, 2-dimethylamino-2-methyl 1-propanol (DMAMP) and triethanolamine) and alkali metal hydroxides (such as lithium, sodium and potassium hydroxides). Primary and/or secondary amines may be also used as the neutralizers for the acid groups. The degrees of neutralization are generally between about 60% to about 140%, for example, in the range of about 80% to about 120% of the acid groups. The neutralizer may be present in about 0.5% to about 0.9%, based upon total weight of the aqueous polyurethane dispersion.

The neutralizer may comprise TEA, or may comprise TEA and a second neutralizer. The neutralizer may comprise TEA and DMAMP.

The neutralizer may comprise DMAMP. The aqueous polyurethane dispersion may comprise about 0.2% to about 2.0%, or about 0.5% to about 1.5% of DMAMP, based upon total weight of the aqueous polyurethane dispersion. The aqueous polyurethane dispersion disclosed herein may be free from TEA. "Free from," as used herein, means that there is less than about 0.01% of TEA, and preferably 0.00% of TEA, based upon total weight of the aqueous polyurethane dispersion. In an embodiment, the aqueous polyurethane dispersion contains less than about 0.1% of TEA, based upon total weight of the aqueous polyurethane dispersion.

The neutralizer may comprise DMAMP. The aqueous polyurethane dispersion may comprise about 0.2% to about 2.0%, or about 0.5% to about 1.5% of DMAMP, based upon total weight of the aqueous polyurethane dispersion. The aqueous polyurethane dispersion disclosed herein may be free from TEA. "Free from," as used herein, means that there is less than about 0.01% of TEA, and preferably 0.00% of TEA, based upon total weight of the aqueous polyurethane dispersion. In an embodiment, the aqueous polyurethane dispersion contains less than about 0.1% of TEA, based upon total weight of the aqueous polyurethane dispersion.

The neutralizer may comprise DMAMP and a second neutralizer, wherein the second neutralizer is not TEA. The second neutralizer may be, but is not limited to tertiary amines (other than TEA, such as N,N-diethylmethylamine, N-methylmorpholine, N,N-diisopropylethylamine, 2-dimethylamino-2-methyl 1-propanol and triethanolamine), alkali metal hydroxides (such as lithium, sodium and potassium hydroxides), primary, secondary amines, or any combination thereof. When present, the aqueous polyurethane dispersion may comprise about 0.3% to about 2.0% of DMAMP, and 0.1% to about 1.0% of a second neutralizer, based upon total weight of the aqueous polyurethane dispersion. The aqueous polyurethane dispersion may comprise about 0.5% to about 1.2% of DMAMP, and about 0.2% to about 0.8% of a second neutralizer, based upon total weight of the aqueous polyurethane dispersion, in order to keep the degree of neutralization in between of 60% to 140%.

Water may function as a chain extender for the prepolymer. Optionally, a diamine such as ethylenediamine (EDA) can be used a coextender.

Examples of suitable diamine chain extenders include: 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis(cyclohexylamine), isophorone diamine, 2,2-dimethyl-1,3-propanediamine, meta-tetramethylxylenediamine, and Jeffamine® (Texaco) of molecular weight less than 500.

Examples of surfactants include, but are not limited to, anionic, cationic, or nonionic dispersants or surfactants, such as alkyldiphenyloxide disulfonate, sodium dodecyl sulfate, sodium dodecylbenzenesulfonate, ethoxylated nonyphenols, and lauryl pyridinium bromide. The surfactant may be present in about 1.0% to about 5.0%, about 1.0% to about 2.0%, or about 1.0% to about 1.5%, based upon total weight of the aqueous polyurethane dispersion.

Examples of suitable surface active agents include, but are not limited to, anionic, cationic, or nonionic dispersants or surfactants, such as sodium dodecyl sulfate, sodium dodecylbenzenesulfonate, ethoxylated nonylphenols, and lauryl pyridinium bromide.

Examples of suitable antifoaming or deforming or foam controlling agents include, but are not limited to, Additive 65 and Additive 62 (silicone based additives from Dow Corning), FoamStar® I 300 (a mineral oil based, silicone free defoamer from Cognis), mineral oils and/or silicone oils such as BYK 012, and Surfynol™ DF 110L (a high molecular weight acetylenic glycol non-ionic surfactant from Air Products & Chemicals). The defoamer may be present in about 0.01% to about 1.0%, about 0.1% to about 0.5%, or about 0.1% to about 0.3%, based upon total weight of the aqueous polyurethane dispersion.

Examples of suitable rheological modifiers include, but are not limited to, hydrophobically-modified ethoxylate urethanes (HEUR), hydrophobically-modified alkali swellable emulsions (HASE), and hydrophobically-modified hydroxyethyl cellulose (HMHEC).

Examples of suitable thickeners include, but are not limited to, polyurethanes such as Tafigel PUR 61 by Munzing, hydrophobically-modified ethoxylate urethanes (HEUR), hydrophobically-modified alkali swellable emulsions (HASE), and hydrophobically-modified hydroxy-ethyl cellulose (HMHEC). The thickener may be present in about 1.0% to about 5.0%, about 1.0% to about 2.0%, or about 1.0% to about 1.5%, based upon total weight of the aqueous polyurethane dispersion.

Examples of antioxidants include, but are not limited to hindered phenols such as Irganox 245 (BASF) or Cyanox 1790 (Cytec). The antioxidant may be present in about 0.3% to about 1.0%, about 0.5% to about 1.0%, or about 0.5% to about 0.8%, based upon total weight of the aqueous polyurethane dispersion.

Examples of a suitable polymeric component include: polyethylenimine, poly(vinylamine), poly(allylamine), and poly(amidoamine) dendrimers.

Other additives that may be optionally included in the aqueous polyurethane dispersion or in the prepolymer include: anti-oxidants, UV stabilizers, silicones, mineral oils, colorants, pigments, delusterants, crosslinking agents, phase change materials (e.g., Outlast®, commercially available from Outlast Technologies, Boulder, Colo.), antimicrobials, minerals (e.g., copper), microencapsulated well-being additives (e.g., aloe vera, vitamin E gel, aloe vera, sea kelp, nicotine, caffeine, scents or aromas), nanoparticles (e.g., silica or carbon), calcium carbonate, flame retardants, anti-tack additives, chlorine degradation resistant additives, vitamins, medicines, fragrances, electrically conductive additives, and/or dye-assist agents (e.g., Methacrol®, commercially available from E. I. DuPont de Nemours, Wilmington, Del.). Other additives which may be added to the prepolymer or the aqueous dispersion comprise adhesion promoters, durability improvement agents, modulus modifiers, texturing agents, tackifiers, anti-static agents, anti-cratering agents, anti-crawling agents, optical brighteners, coalescing agents, electroconductive additives, luminescent additives, flow and leveling agents, freeze-thaw stabilizers, lubricants, organic and inorganic fillers, preservatives, texturizing agents, thermochromic additives, insect repellants, and wetting agents, and other additives known for use by those of ordinary skill in the art to achieve desired benefits and properties.

In an embodiment, a delusterant, such as titanium dioxide, may be added to the aqueous polyurethane dispersion. Any desired amount known in the art to impart the desired properties may be added. For example, about 0.2% to about 10%, based upon total weight of the aqueous polyurethane dispersion, of the delusterant may be added.

Such optional additives may be added to the aqueous polyurethane dispersion before, during, or after the prepolymer is dispersed, as the process allows.

In an embodiment, the dispersion may be prepared by the addition of the prepolymer using a rotor/stator high speed disperser. The prepolymer as made above is transferred directly into the disperser head and dispersed under high shear forces into deionized water preferably containing at least a surfactant, a neutralizer, an anti-oxidant and a foam control agent. Slightly more prepolymer than required by the dispersion recipe is needed to compensate for loss in the transfer line and in the reactor. Once the addition of the prepolymer is complete, a thickener can be added.

Aqueous polyurethane dispersions falling within the scope of the present invention should be expected to have a solids content of from about 10% to about 50% by weight, from about 30% to about 50% by weight, about 30% to about 45%, or about 35% to about 46%. The viscosity of aqueous polyurethane dispersions falling within the scope of the present invention may be varied in a broad range from about 10 centipoises to about 100,000 centipoises depending on the processing and application requirements. For example, in one embodiment, the viscosity is in the range of about 500 centipoises to about 30,000 centipoises. The viscosity may be varied by using an appropriate amount of thickening agent, such as from about 0 to about 5.0 wt %, based on the total weight of the aqueous polyurethane dispersion.

The aqueous polyurethane dispersions disclosed herein have a manufacturing advantage over other dispersions, specifically those that contain an aromatic isocyanate, instead of an aliphatic isocyanate. This is due primarily to the reactivity of an aliphatic isocyanate vs. an aromatic isocyanate. The aliphatic isocyanate used in the aqueous polyurethane dispersions disclosed herein reacts much slower when the prepolymer is dispersed in water, which allows adequate time for the viscous prepolymer to break apart into finer droplets. Thus, the dispersion has smaller and more uniform particles, which can be filtered easily by on-line filtration system. When an aromatic isocyanate is used instead, the dispersion reacts quickly in water, and can cause the prepolymer droplets to solidify before breaking into small particles. This leaves large amount of grit in the dispersion, which requires off-line filtration with reduced yield and productivity.

It has been found that upon drying, the dried aqueous polyurethane dispersion of the present invention may form a continuous elastic film with high stretch and recovery. Given that the films and fabrics are porous materials, it is recognized that the film or dispersion may partially or completely impregnate the fabric of the shaping article. For example, the dried aqueous polyurethane dispersion may form a layer which is partially separate from the surrounding layers, or may be completely transferred to the surrounding layer or layers to form an integrated article without a distinguishably separate film layer.

Further, the aqueous polyurethane dispersion is resistant to yellowing and hydrolysis. In particular, the aqueous polyurethane dispersion of the present invention, and shaped articles made therefrom, has been found to have improved whiteness retention (also referred to as improved resistance to oxidative discoloring (or yellowing)) as compared to other films or articles made from other dispersions known in the art, such as those containing an aromatic isocyanate. This is particularly important for consumer goods as yellowing or discoloration is particularly objectionable for garments and consumer goods.

A CIE whiteness index value is a whiteness measurement standard developed by the French-based International Commission on Illumination (also abbreviated as CIE) using D65 illumination representing outdoor daylight. Whiteness retention is a measurement of resistance to change in color after treatment or exposure, measured by the change in the CIE whiteness index value over time. Thus, improved whiteness retention of a fabric means that it has a greater resistance to change in color. As used herein and unless otherwise specified, the CIE whiteness index value (absolute value) is understood as that of a sample without a color effecting additive, such as a pigment, colorant, brightener, dye, or the like. One of ordinary skill in the art understands that such additives could be added to an aqueous polyurethane dispersion or shaped article which would alter the absolute value of the CIE whiteness index.

A shaped article, e.g., a film, coated on a Mylar® polyester sheet substrate and formed from the aqueous polyurethane dispersions disclosed herein may have a CIE whiteness index value of about 50 to about 60. After thermal exposure (exposure in a thermal chamber to heated air at 195° C. for five minutes), the film may have a CIE whiteness index value of about 30 to about 40. That is a reduction in CIE whiteness index value of less than about 20 index points, otherwise understood as a reduction in whiteness of about 30% to about 40%. After UV exposure (using, e.g., a Xenon Arc lamp simulating exposure to daylight, including UV) for 8 hours, the film may have a CIE of about 50 to about 60. That is no reduction in CIE whiteness index value after UV exposure, i.e., less than about 2%, or about 0%. After exposure to $NO_2$ (24 hours), the film may have a CIE whiteness index value of about 48 to about 58, and a reduction in CIE whiteness index value of about 0 to 3 index points. That is a reduction in CIE whiteness value of less than about 5%, or about 0% to about 4%.

In addition, the film formed from a dried aqueous polyurethane dispersion disclosed herein has improved tensile properties over films made from other dispersions. The film may have a tensile strength (when the film is stretched in the sixth cycle) of over about 0.14 g/denier, or over about 0.15 g/denier. The film may have a tensile strength of about 0.14 g/denier to about 0.24 g/denier, or about 0.15 g/denier to about 0.22 g/denier. It was found that higher tensile strengths are possible when the NCO/OH ratio of the prepolymer, or aqueous polyurethane dispersion, is between about 1.50 and about 1.90, with the polymer number average molecular weight larger than 10,000. An NCO/OH ratio lower than about 1.5 produces films that have less or inadequate power (stretch/recovery), and an NCO/OH ratio higher than about 1.9 produces films that are brittle and have reduced elongation (ELO).

In an embodiment, the film formed from a dried aqueous polyurethane dispersion having NCO/OH ratio of about 1.50 to about 1.90, may have a tensile strength of about 0.14 g/denier to about 0.24 g/denier, or about 0.15 g/denier to about 0.22 g/denier. That aqueous polyurethane dispersion may also have a milliequivalent carboxylic acid per kg of prepolymer of about 150 to about 220, about 155 to about 220, or about 180 to about 190.

Figure 16:
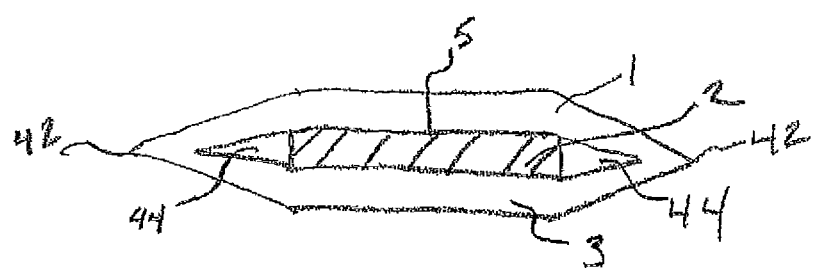
FIG. 16 shows a cross-section of the multiple layer fabric of FIG. 14A along line X-X.
Figure 17:
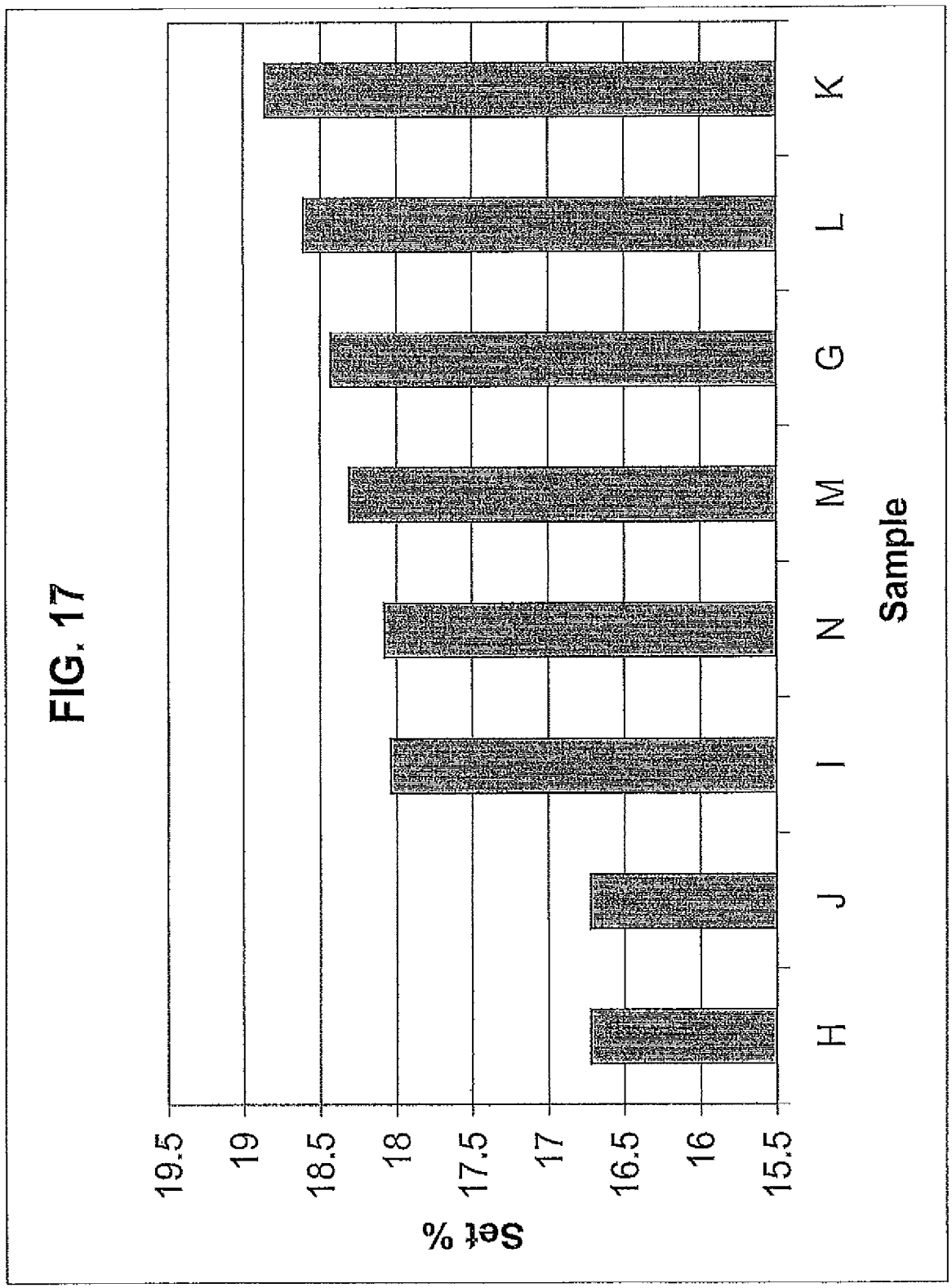
FIG. 17 is a graphic representation of the set % of garments laminated with polymer compositions.
Figure 18:
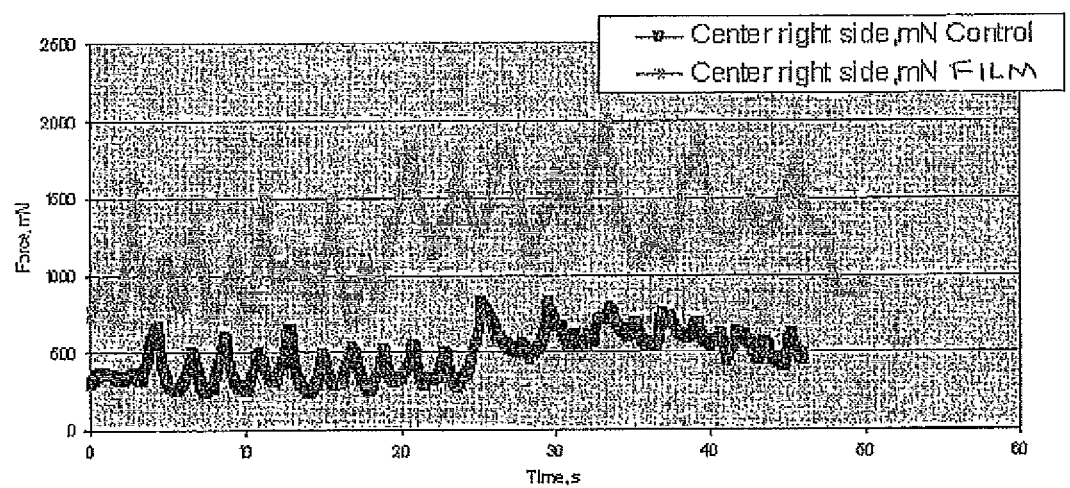
FIG. 18 is a graphic representation of a control fabric compared to a film.
Figure 19:
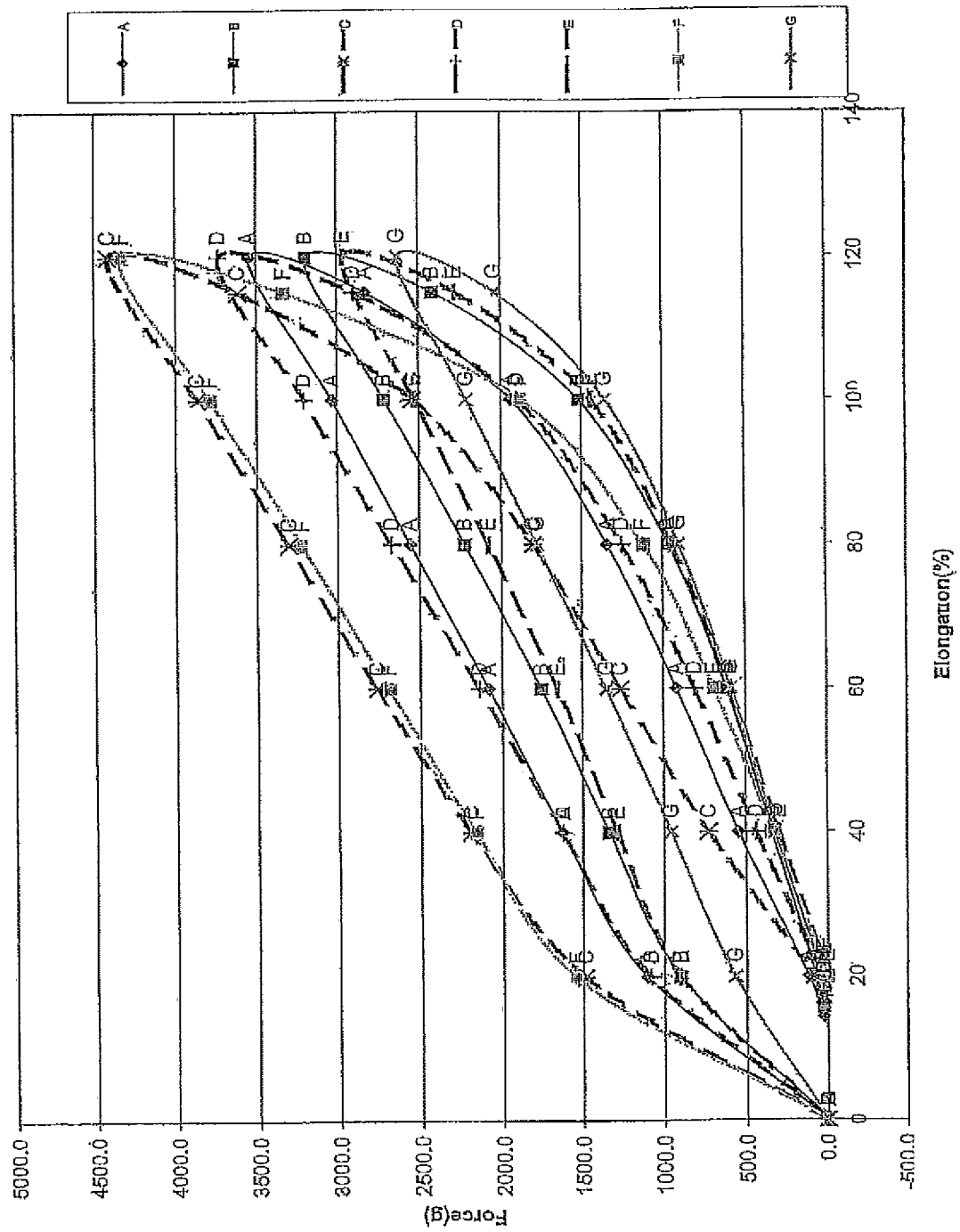
FIG. 19 is a graphic representation of a stress/strain analysis.
Figure 20:
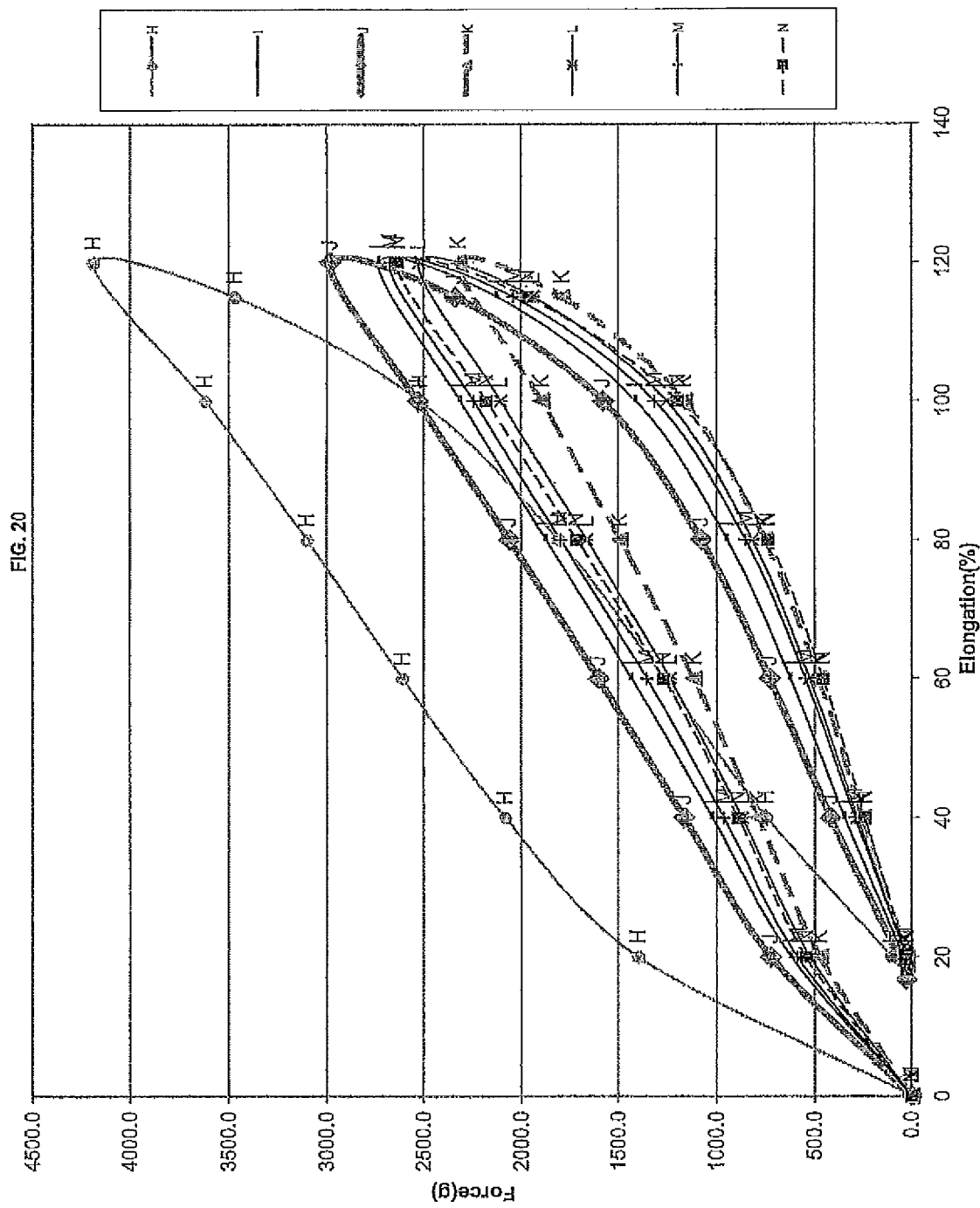
FIG. 20 is a graphic representation of a stress/strain analysis

In an embodiment, a single layer of a fabric or foam may be folded to form two or more layers of the multiple layer article with a film or aqueous polyurethane dispersion as an intermediate layer (where the film may be considered 'embedded' within the article). In this embodiment, the article may then also be molded or pressed to a desired shape, such as for a body shaping garment. Single-layer and multi-layered articles may be molded. Molded and non-molded articles may have different levels of stretch and recovery. The molded articles may comprise a body shaping or body supporting garment, such as a brassiere, sports bra or bralette. Where a film is placed at the point of folding, it may provide additional stretch recovery power, such as at a hem or for a body shaping garment, and additional support. This is also useful in a garment such as an underbust bra where the film/tape placement may provide increased wall strength or rigidity and may keep the garment from rolling at the edge. The film may also be placed at the point where the edges of the single layer meet which form the double layer fabric as shown in FIG. 16 which is described hereinbelow in more detail. Additional fabric or foam layers may also be included within the folded over layer as desired. For example, a fabric layer may be folded over to form two layers where a film and a foam are included within the folded area.

In an embodiment, the film may form an external layer. Including the film on an external surface forms many advantageous functions. For example, the film may provide an anchor or area of increased friction to reduce the relative movement between the fabric laminate and an external substrate. This is particularly useful when the article is an undergarment including a skin-contacting surface (where the wearer's skin is the substrate). Alternatively, the substrate may be outer clothing which is in contact with the fabric laminate of the inventive article. Where the substrate is outer clothing of a wearer and the article is worn as an undergarment, the article prevents or reduces the relative movement of the outer garment. In addition, an outer garment (e.g. a dress) may include an inventive film to maintain the relative placement of an inner garment (e.g., a slip).

After the layers of fabric, foam, and the film have been selected, they may subsequently be adhered through pressing or molding to form flat or shaped articles (including articles having three-dimensions such as a molded breast cup). The processes to prepare the pressed and molded articles of some embodiments include the use of pressure and heat as necessary. For example, heat may be applied at about 150° C. to about 200° C. or about 180° C. to about 190° C., including about 185° C. for a sufficient time to achieve a molded article. Suitable times for application of heat include, but are not limited to, from about 30 sec to about 360 sec including from about 45 sec to about 120 sec. Bonding may be effected by any known method, including but not limited to, microwave, infrared, conduction, ultrasonic, pressure application over time (i.e. clamping) and combinations thereof. With the application of heat and pressure to the articles including films or aqueous polyurethane dispersions, and given that films and fabrics are themselves porous materials, it is recognized that the film or dispersion may partially or completely impregnate the fabric or foam of the article.

After application of the inventive aqueous polyurethane dispersion or film, the garment may exhibit improved moisture transport, comfort, and lighter weight and feel (e.g., when sew-in panels are eliminated) when compared to conventional garments of the same type that do not incorporate the aqueous polyurethane dispersion or shaped article. In addition, unlike some conventional garments that have extra seams, panels sewn-in or bonded, and/or layers of material to create improved hold, the aqueous polyurethane dispersion or shaped article of the present disclosure may be applied directly to the fabric or material of the garment to create the hold, thereby eliminating the need for extra seams, panels and material.

An article of the present invention may be a body-shaping garment, such as bust supporting garment, including a brassiere, bralette or sports bra, other women's undergarment, and men's undergarment. These articles can provide the desirable features of body shaping and support while still providing comfort, breathability, air permeability, moisture/vapor transport, wicking, and combinations thereof. In an article of an embodiment of the present invention, the layers of fabric and film may take on predetermined shapes and may be arranged in predetermined orientations relative to each other in the design of a molded or shaped article such as the cups of a brassiere construction. The layers may be used either alone or in combination with other materials that are sewn, glued or otherwise applied to the fabrics.

In some embodiments there is a system for the construction of a garment with integrated shaping ability provided by the fabric. This system of construction may be used in a variety of different garment constructions such as activewear, sportswear, men's and women's intimate apparel such as bras, underwear, panties, shaping garments, legwear and hosiery such as pantyhose, ready-to-wear garments such as denim jeans, camisoles, tailored shirts, and pants among others. This construction may be applied to any formable body area. While many advantages of the fabric constructions are included, it is further recognized that the utility is not limited to garments, but also finds applicability with any shapeable or formable medium, including cushions for furniture which are also subject to movement and potential slipping of a fabric in contact with the shapeable area.

In order to add additional support and other features, the film composition may be added to different areas of the article. For example, it may either extend through the entire area of the article or to a selected portion to provide different benefits. For example, a bust supporting garment, such as a brassiere, bralette or sports bra, may include a film applied in the cup portion. In the cup, it can be useful to use a portion of film in the lower periphery of the cup for support, in a central portion of the cup for modesty, in the side periphery for shaping, and/or in specific areas for embellishment or decoration. In another embodiment, the film may be applied in the lower peripheries of the cup of a bust supporting garment for support, in a central portion for modesty, in the side peripheries for shaping, in the wing portions, or any combination thereof. Any number of combinations of applications are possible to provide the desired shaping or support.

In an embodiment, the aqueous polyurethane dispersion or film may be applied to swimwear, active wear or shapers in the bust, belly, thighs, seat, or any combination thereof. In another embodiment, the aqueous polyurethane dispersion or shaped article may be applied to active wear or shapers in the calf, arms, chest, bust, belly, thighs, seat, or any combination thereof. It has been found that a small amount of the aqueous polyurethane dispersion selectively placed and applied on garments leads to significant affects and results on the human body (e.g., in terms of shape, comfort and/or support) in those areas to which the aqueous polyurethane dispersion has been applied.

When the aqueous polyurethane dispersion or shaped article is applied to swimwear, the swimwear exhibits improved chlorine resistance. Surprisingly, the improved chlorine resistance of the swimwear is achieved without incorporating additives that are known in the art to improve chlorine resistance, such as a mineral additive being a mixture of huntite and hydromagnesite, as disclosed in U.S. Pat. No. 5,626,960, which is incorporated by reference herein in its entirety. Without being limited to a theory, it is believed that improved chlorine resistance is achieved because the inventive film breaks down and wears away slowly. Additionally, after exposure to a chlorinated environment, the hold (or fabric retractive force due to elastic properties of the applied dispersion) and altered stress profile of the garment where the aqueous polyurethane dispersion or shaped article has been applied remains substantially constant, even after about 30, about 40, about 60, about 100, about 180 or about 200 hours in a chlorinated environment. The chlorinated environment may have a pH of about 7.5, a chlorine concentration of about 3.5 ppm, and a temperature of about 25° C. Substantially constant means that percentage change in the fabric modulus to a 40% stretch is not reduced more than about 15%, or about 10%, after an initial decrease in the first ten hours to the specified time. While the absolute value of the force required to stretch the treated fabric (which also may be referred to as modulus boost or hold) decreases over time, it decreases at approximately the same rate as the underlying fabric. Therefore, the hold remains approximately constant.

After 220 hours in a chlorinated environment, the hold (or gram-force of the fabric strength) was surprisingly shown to decrease at a rate equal to that of the chlorine resistant protected spandex in the underlying fabric. This occurs despite the fact that the aqueous polyurethane dispersion does not contain any additives known to the industry to protect segmented polyurethanes, such as spandex. Of course, it is known to one of ordinary skill in the art that chlorine resistance may be otherwise enhanced by adding known additives that impart said property.

It is understood that the swimwear discussed in relation to improved chlorine resistance is made from fabric that is of good quality and remains intact after 220 hours in a chlorinated environment.

In the figures of the disclosure, the films are shown as a separate layer for clarity only. As explained above, the film on attachment may partially or completely fill the pores of the fabric or foam substrate.

In FIGS. 1-3, 8-9, and 14-15, a portion of fabric is shown having a substantially trapezoidal shape. Such a shape is useful as a bra wing portion, as discussed. However, although referred to a a bra wing portion, the fabric portion may be useful in other areas of a garment and is shown to demonstrate an example of how a film may be oriented with respect to the shape of the fabric to alter the stress-profile of the fabric. A variety of geometric shapes for both the fabric portion and the film portion are contemplated and can be chosen based on the desired alteration of stress-profile. The alteration may be to provide comfort by distributing stress throughout the garment or to increase stress in portions of the garment to provide additional control or support.

As shown in FIG. 1, a film composition 2 may be geometrically inverted onto a portion of a garment such as a bra wing portion 1, which is a substantially trapezoid shape, and is shown as a trapezoid. The corners 4 that overlap extend beyond the edges of the wing portion may be folded over or cut to shape of the film.

Figure 2:
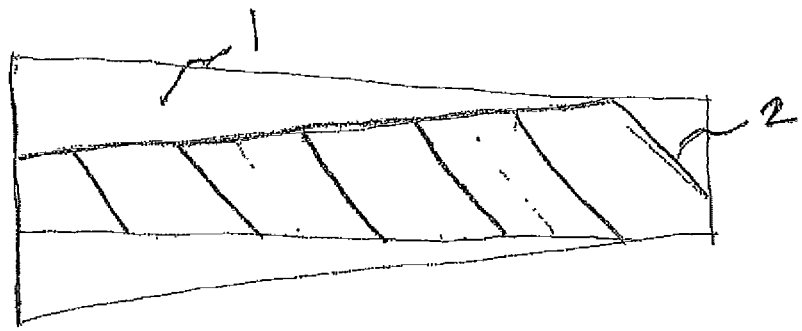
FIG. 2 shows a portion of fabric including a geometrically inverted film of dried aqueous dispersion.

As an alternative, FIG. 2 also shows a film composition 2 that has been geometrically inverted onto a wing portion 1, however, while the film has substantially the same shape as the wing portion, it is reduced in size to avoid the overlapping corners 4 of FIG. 1, while still providing an altered stress profile.

In either FIG. 1 or FIG. 2, the fabric section 1 may be a wing including a trapezoid having a wide end and a short end. The film 2 also has a wide and a short end. The short end of the film is placed corresponding to the wide end of the fabric section and the wide end of the film is placed corresponding to the shorter end of the fabric section.

Figure 8:
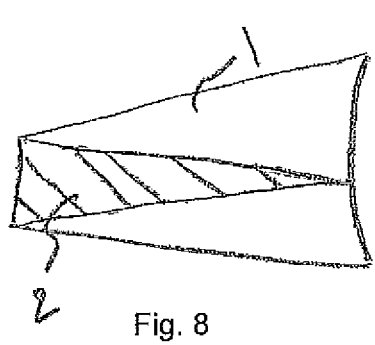
FIG. 8 shows a portion of fabric including a triangular shaped film region.
Figure 9:
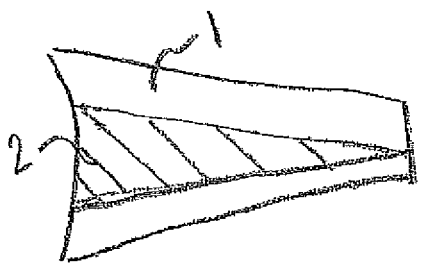
FIG. 9 shows a portion of fabric including a triangular shaped film region.

FIG. 8 and FIG. 9 also show fabric portions 1 having a film region 2 bonded to the fabric portion 1. In each of FIG. 8 and FIG. 9, the film region has a triangular shape.

Figure 3:
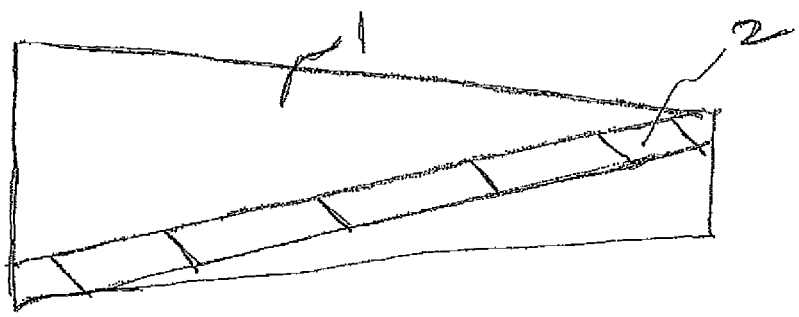
FIG. 3 shows a portion of fabric including a narrow strip of film of dried aqueous dispersion.

As shown in FIG. 3, another method of altering the stress profile of a garment, such as a wing 1 is to include a narrow strip of a film 2. Although this film shown appears substantially linear, it is understood that this may be modified to a non-linear shape depending on the manner of altering the stress profile that is selected. The film 2 may extend to the edges of the wing 1 as shown or may alternatively begin and end at intermediate portions of the wing 1. The film 2, may be oriented along a diagonal (as it appears in FIG. 3) or may be perpendicular to the wing edge.

In other words, the fabric section may have a top portion an intermediate portion and a bottom portion where the film is oriented adjacent to two or more portions of the fabric section. The film may be oriented along a diagonal from the top of the fabric section to the bottom of the fabric section, along a diagonal at other portions within the fabric or perpendicular to the fabric section.

Figure 4:
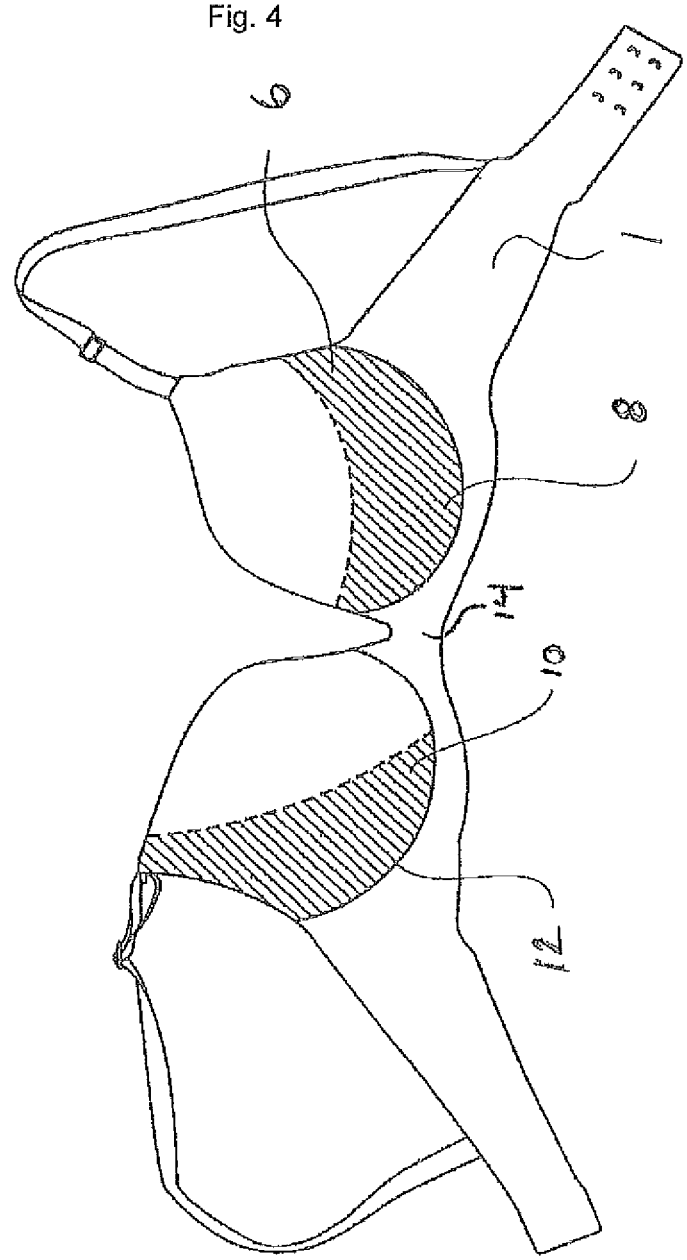
FIG. 4 shows a brassiere including film regions along a lower and side periphery.

FIG. 4 shows a brassiere as an example of a garment that can include the film to alter the garment's stress profile. The brassiere includes a wing portion 1 and two breast cup portions 6 and 10. The cup portion 6 includes a film 8 located along the bottom periphery of the cup 6. The other cup portion 10 includes a film that is located along the side periphery 12. The side periphery film 12 and the bottom periphery film 8 can be used together or separately to adjust the stress profile of the garment to provide shaping and support. Although a brassiere is shown as the example, it is understood that this could apply to other formable areas of the body, such as the derriere (also referred to as the seat), the thighs, or the belly.

Figure 5:
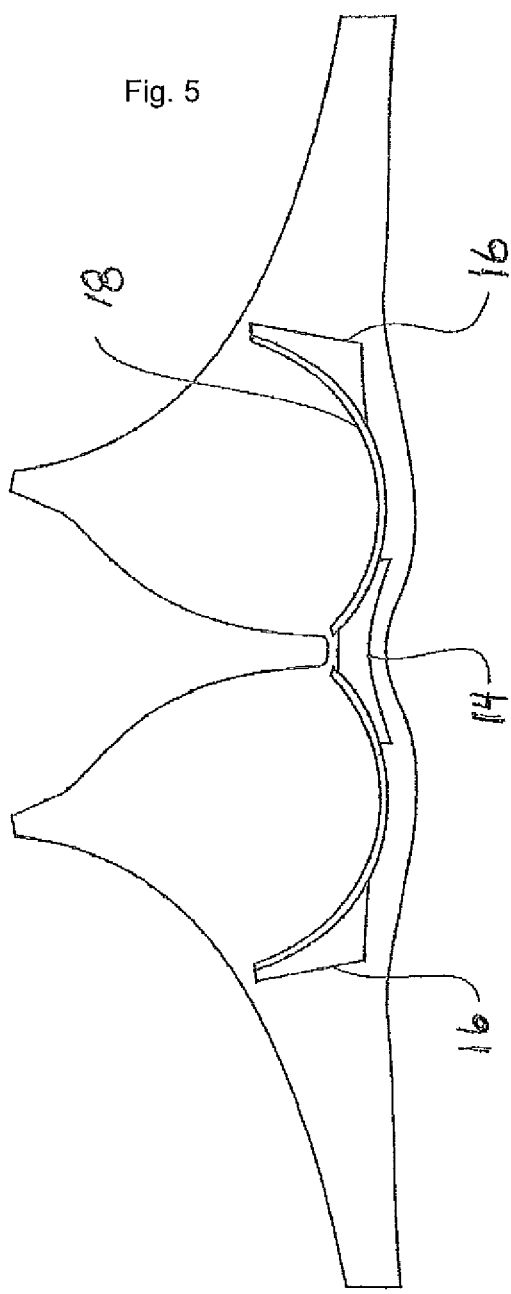
FIG. 5 shows a brassiere including film regions.

FIG. 5 also shows a brassiere including an underwire portion 18. The underwire portion is also a potential cause of a pressure point in a brassiere. The addition of films 14 and 16 can provide one or both of additional comfort and support by altering the stress profile to which the underwire portion 18 contributes.

Although the brassieres of FIGS. 4-7 appear to be back closure brassieres that include straps, it is understood that straps are optional, that a front closure (not shown) may be included in the area between the breast cups at 14, and that the brassieres may or may not include a bridge between the cups.

Figure 6:
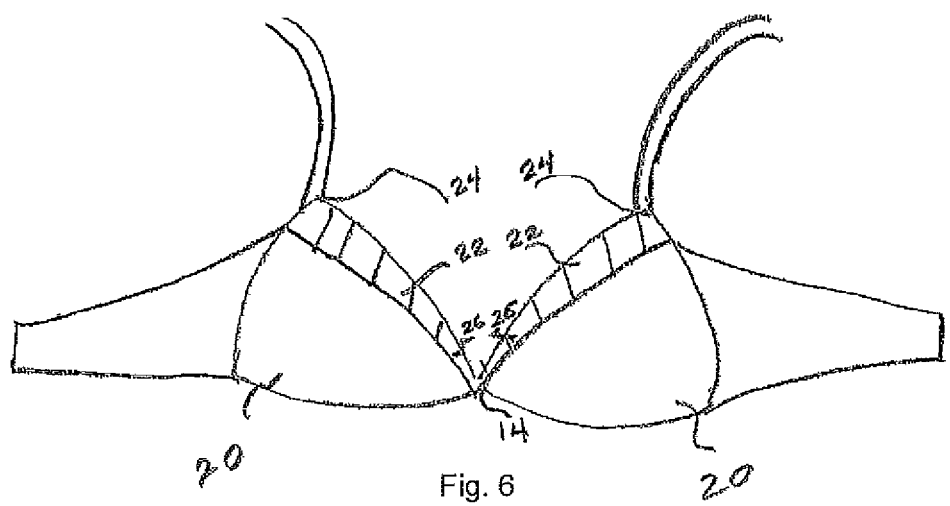
FIG. 6 shows a brassiere including film regions.
Figure 7:
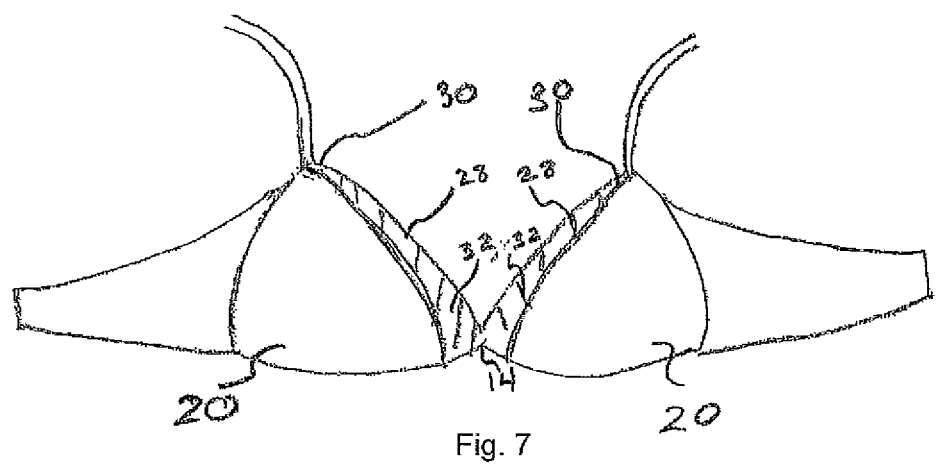
FIG. 7 shows a brassiere including film regions.

The brassiere of FIG. 6 includes two breast cup portions 20 each having a film portion 22 at the inner part of the cup. The stress profile of the cup portions 20 are altered by including the film portions 22 which may vary in width from the top part of the cup 24 which is wider as shown as the film portion 22 extends to the inner part of the cup 26. The opposite configuration is shown in FIG. 7, where the cup portions 20 include film portions 28 that vary in width from a narrow part at the top of the cup 30 extending to the bottom inner part of the cup 32. Altering the stress profile of this area of the brassiere can avoid pinch points while provide support or enhancement as desired. In order to achieve the desired effect, other geometries or configurations of the film portions 22 and 28 are contemplated.

Figure 10:
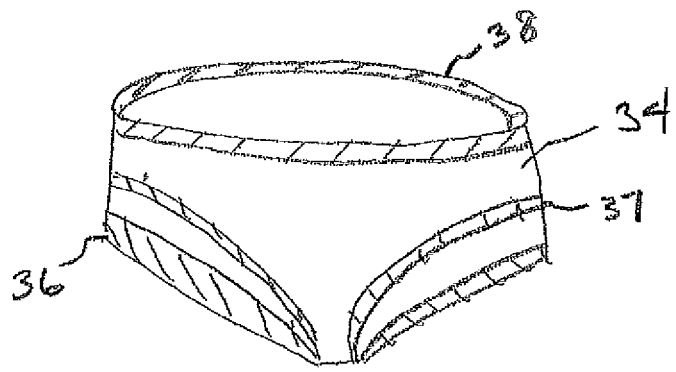
FIG. 10 shows a panty including film regions.
Figure 11:
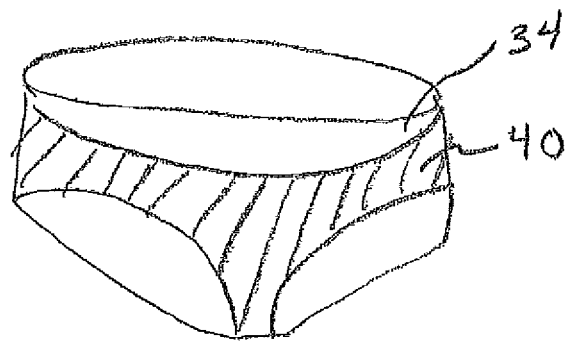
FIG. 11 shows a panty including film regions.

FIG. 10 and FIG. 11 each show a panty 34 including different film portions 36, 37, 38 and 40. The film region 36 can be located at the waistband as shown in FIG. 10 to provide the garment with a reduced stress profile to reduce the appearance of the waistband through clothing. The width of the film 36 can vary in the front or back of the garment to reduce pressure providing a pinch point or alter the stress profile to increase support (such as by providing tummy control). Similarly, the film portions at the leg bands 36 and 37 can vary in width to provide distribution of stress along the back portion decreasing a pinch point that can show as a panty line under clothing, such as by increasing the width of the film along the back portion 37. FIG. 1I includes a film region 40 of a different geometry that can provide additional control, such as tummy control, or by providing support useful for maternity panties.

Figure 12:
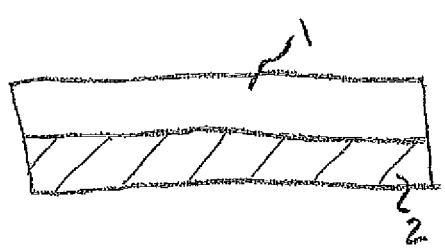
FIG. 12 shows a film on a substrate.
Figure 13:
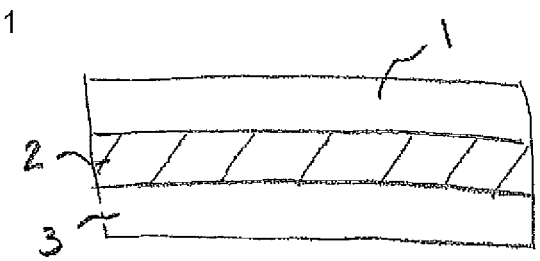
FIG. 13 shows a film between two substrates.

Any of the film regions 1 may be included on a single surface 2 as shown in FIG. 12 where the surface 2 may be either a fabric, foam or other substrate suitable for a garment. Alternatively, the film 2 may be included between two surfaces such as a fabric, foam, etc. as in FIG. 13 where a top surface layer 1 and bottom surface layer 3 are included.

Figure 14:
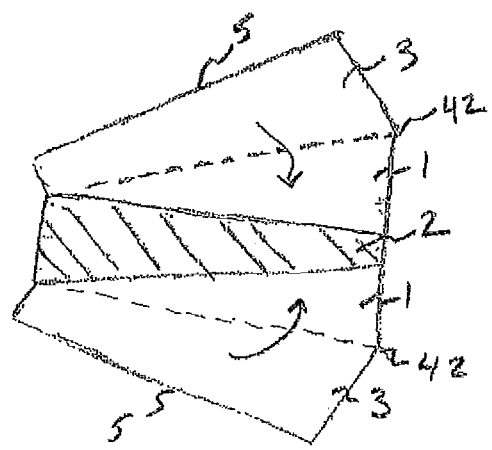
FIG. 14 shows a portion of fabric including a film region.
Figure 14A:
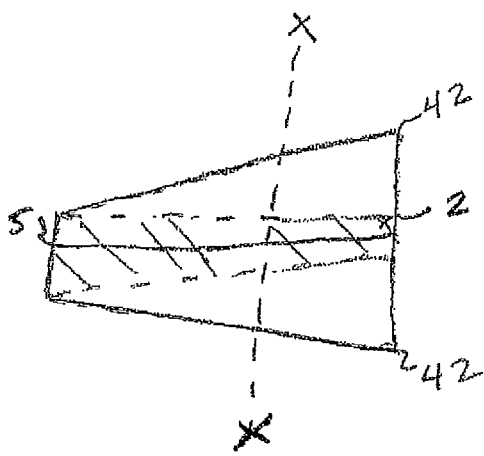
FIG. 14A shows a multiple layer portion of fabric including a film region.
Figure 15:
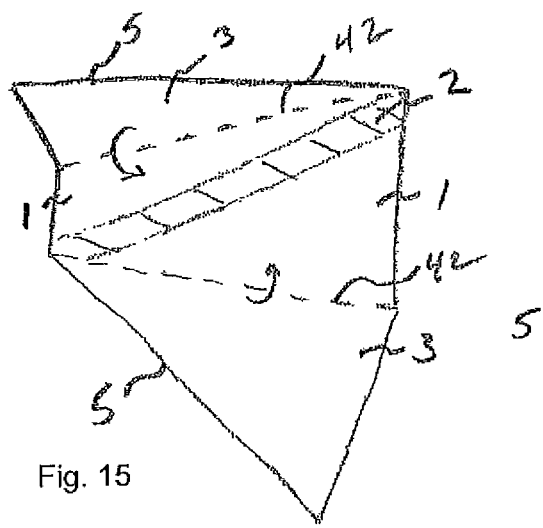
FIG. 15 shows a portion of fabric including a film region.
Figure 15A:
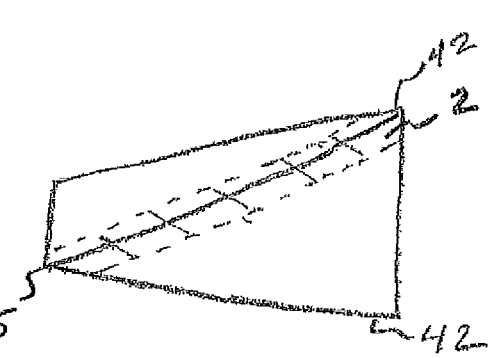
FIG. 15A shows a multiple layer portion of fabric including a film region.

FIG. 14 and FIG. 15 show two possibilities for using a folded over fabric that provides a top surface layer 1 and a bottom surface layer 2 after folding along a preselected folding lines 42. Arrows show the direction of folding in FIG. 14 and FIG. 15. The edges of the bottom surface layers 3 meet to form a butt seam 5 as shown in FIG. 14A and FIG. 15A. The edges 5 may be attached or bonded to the film region 2 at that point.

FIG. 16 is a cross-section of a butt seam at line X-X as indicated in FIG. 14A. The seam 5 indicates the edges of the fabric or other substrate that is folded over and bonded or attached. The film region 2 may be bonded to the top surface 1, the bottom surface 3 or two both the top and bottom surfaces. The folded portion 42 is indicated to demonstrate the orientation of layer prior to bonding, however, where the fabric is sufficiently thin, the cross-section will appear substantially linear. Also, a space 44 is shown to demonstrate that the bonded film 2 may not extend to the folded portion 42 of the fabric, however, this space 44 may be absent depending on the bonding technique because the film may melt and fill this available space.

In an embodiment, the film may act as an adhesive to attach two or more layers of fabric or foam, or to attach a layer of fabric to foam. One suitable method for accomplishing this is to apply the inventive aqueous polyurethane dispersion to a layer of fabric or foam by any suitable method. Methods for applying the aqueous polyurethane dispersion include spraying, kissing, printing, brushing, dipping, padding, dispensing, metering, painting, and combinations thereof. This may be followed by application of heat and/or pressure.

Optionally, in an embodiment, an adhesive may be used to attach a film to a fabric or foam layer. Examples of suitable adhesives include, but are not limited to, thermoset or thermoplastic adhesives, pressure sensitive adhesives, hot melt adhesives, and combinations thereof. The adhesive may be used to adhere layers and may be applied to any of the fabric, foam, fabric laminate or film. The inventive aqueous polyurethane dispersion may also be used as an adhesive to adhere more than one layer of any fabric, foam or film as described in some embodiments. Alternatively, the film may be sewn into a garment.

As described above, there are a variety of fabric constructions that are useful for the articles of the present invention. In addition, the dried aqueous polyurethane dispersion may provide structural properties, flexibility, adhesion, or any combination of these. The order of layer arrangement may be (1) fabric layer, foam layer, aqueous polyurethane dispersion layer; (2) fabric layer, foam layer, aqueous polyurethane dispersion layer, foam layer, fabric layer; (3) fabric layer, aqueous polyurethane dispersion layer, fabric layer; (4) foam layer, aqueous polyurethane dispersion layer, foam layer; (5) foam layer, aqueous polyurethane dispersion layer; (6) fabric layer, aqueous polyurethane dispersion layer; or any combination of these which may be combined to achieve more layers in the fabric construction. An adhesive may be included to adhere any of the layers, including wherein the aqueous polyurethane dispersion composition is the adhesive.

In an embodiment, no organic solvents are added to the dispersion. In another embodiment, an organic solvent may be used in the preparation of a film or dispersion. An organic solvent may be used to lower the viscosity of the prepolymer through dissolution and dilution and/or to assist the dispersion of solid particles of the diol compound having a carboxylic acid group such as 2,2-dimethylolpropionic acid (DMPA) to enhance the dispersion quality. It may also serve for the purposes to improve the film uniformity such as reducing streaks and cracks in the coating process.

An organic solvent suitable for use herein is substantially or completely non-reactive to isocyanate groups, stable in water, and has a good solubilizing ability for DMPA, the formed salt of DMPA and triethylamine, and the prepolymer. Examples of suitable solvents include N-methylpyrrolidone, N-ethylpyrrolidone, dipropylene glycol dimethyl ether, propylene glycol n-butyl ether acetate, N,N-dimethylacetamide, N,N-dimethylformamide, 2-propanone (acetone) and 2-butanone (methylethylketone or MEK).

When used, the amount of organic solvent added to the film or dispersion varies. The organic solvent may be included in amounts of less than 50% by weight of the dispersion. Smaller amounts may also be used such as less than 20% by weight of the dispersion, less than 10% by weight of the dispersion, less than 5% by weight of the dispersion, or less than 3% by weight of the dispersion.

The inventive aqueous polyurethane dispersions are particularly suitable for adhesive films, which can be used for fabric bonding, lamination, and adhesion purposes when applied with heat and pressure for a relatively short period of time. Pressures, can for example, range from about atmospheric pressure to about 60 psi and times can range from less than about one second to about 30 minutes in accordance with the bonding method used.

Some films of dried aqueous polyurethane dispersions may be made by coating the dispersion onto a release paper and drying to remove water at temperatures below about 100° C. through commercially available processes to form a film on the paper. The resulting film sheets can be slit into strips of desired width and wound-up into spools for later use in applications to form stretch articles, for example textile fabrics. Examples of such applications include: stitch-less or seamless garment constructions; seam seal and reinforcement; labels and patches bonding to garments; and localized stretch/recovery enhancement. The adhesion bonding can be developed in the temperature range of from about 100° C. to about 200° C., such as from about 130° C. to about 200° C., for example, from about 140° C. to about 180° C., in a period of 0.1 seconds to several minutes, for example, less than about one minute. Typical bonding machines include Sew Free (commercially available from SewSystems in Leicester, England), Macpi hemming machine (commercially available from the Macpi Group in Brescia, Italy), Framis hot air welding machine (commercially available from Framis Italy, s p.a. in Milano, Italy). This bonding is expected to be strong and durable when exposed to repeated wear, wash, and stretch in a textile fabric garment.

The coating, dispersion, or shaped article may be pigmented or colored and also may be used as a design element.

The aqueous polyurethane dispersion can be used alone or with other aqueous dispersions of a different polymer. Further, the aqueous polyurethane dispersion can be cross-linked with selected crosslinking agents, including, e.g., polycarbodiimides and polyisocyanates.

The aqueous polyurethane dispersion may be diluted to a desired solid content prior to application to the substrate. The substrate to which the aqueous polyurethane dispersion is applied may be a textile fabric or a nonwoven material.

The aqueous polyurethane dispersion can be applied directly to the substrate and/or dried as a film, a tape or in various selected patterns such as, but not limited to, dots, shapes such as triangles, circles, and rectangles, zigzags and/or lines depending upon where stretch and recovery is desired. When applied in zigzags or in non-parallel or discontinuous lines, it is possible to manipulate the directionality or intensity (or both) of the changes in elastic modulus. Additional benefits include improved visual design aesthetic (owing to the shape of the applied patterns as well as the ability to add colorant, reflective, or other additives) and ability to manipulate the fabric drape and tactility. For example, while a solid continuous panel may create maximum increase in modulus, it may feel stiff or papery or noisy when handled. Using interrupted, discontinuous, or broken patterns can alleviate the stiff and papery feel in addition to changing the modulus.

In addition, articles with films laminated thereon or aqueous polyurethane dispersions applied thereto can be molded. For example, fabric can be molded under conditions appropriate for the hard yarn in the fabric. Also, molding may be possible at temperature which will mold the fabric laminate or aqueous polyurethane dispersion, but below temperatures suitable for molding the hard yarn.

One suitable method of attaching a layer of film to a substrate is lamination using any method wherein heat or energy is applied to the film. Methods of heat application include, for example, ultrasonic, direct heat, indirect heat, and microwave.

Methods and means for applying the films of some embodiments include, but are not limited to: roll coating (including reverse roll coating); use of a metal tool or knife blade (for example, pouring a dispersion onto a substrate and then casting the dispersion into uniform thickness by spreading it across the substrate using a metal tool, such as a knife blade); spraying (for example, using a pump spray bottle); dipping; painting; printing; stamping; and impregnating the article. These methods can be used to apply dispersion directly onto a substrate without application of additional adhesive materials and may be repeated if additional/heavier layers are required. The dispersions may be applied to any fabrics of knits, wovens or nonwovens made from synthetic, natural, or synthetic/natural blended materials for coating, bonding, lamination and adhesion purposes. The water in the dispersion can be eliminated with drying during the processing (for example, via air drying or use of an oven), leaving the precipitated and coalesced polyurethane layer on the fabrics to form an adhesive bond.

At least one coagulant may optionally be used to control or to minimize penetration of an aqueous polyurethane dispersion into a fabric or other article. Examples of coagulants that may be used include calcium nitrate (including calcium nitrate tetrahydrate), calcium chloride, aluminum sulfate (hydrated), magnesium acetate, zinc chloride (hydrated) and zinc nitrate.

A tool, such as a knife, may be used for applying a film or an aqueous polyurethane dispersion to a fabric. The knife blade can be made of metal or any other suitable material. The knife blade can have a gap of a predetermined width and thickness. The gap may range in thickness, for example, from 0.2 mils to 50 mils, such as a thickness of 5 mils, 10 mils, 15 mils, 25 mils, 30 mils, or 45 mils.

The thickness of a film or an aqueous polyurethane dispersion applied to a substrate may vary depending on the application. In the case of a film (that is, a dried aqueous polyurethane dispersion), the final thickness may, for example, range from about 0.1 mil to about 250 mil, from about 0.5 mil to about 25 mil, from about 0.5 mil to about 12 mil, from about 0.5 mil to about 10 mil, from about 1 to about 9 mil, or from about 1.5 mil to about 6 mil (one mil=one thousandth of an inch).

For an aqueous polyurethane dispersion, the amount applied to a substrate may, for example, range from about 2.5 g/m2 to about 6.40 kg/m2, from about 12.7 kg/m2 to about 635 g/m2, or from about 25.4 kg/m2 to about 152.4 g/m2.

Films and aqueous polyurethane dispersions of the disclosure may be applied to a fabric (woven and nonwoven), as well as to leather (real or synthetic), paper, metal, plastic, and scrim. End products that can be produced using the aqueous polyurethane dispersions and films in this disclosure include, but are not limited to: apparel, which includes any type of garment or article of clothing; knitted gloves; upholstery; hair accessories; bed sheets; carpet and carpet backing; conveyor belts; medical applications, such as stretch bandages; personal care items, including incontinence and feminine hygiene products; and footwear. Also, an article may be coated with an aqueous polyurethane dispersion or covered with a film and be used as a sound suppression article. Non-elastic fabrics incorporating an aqueous polyurethane dispersion or film can have improved stretch and recovery, and improved molding properties.

Accordingly, the aqueous polyurethane dispersions and methods for their application are particularly useful in production of articles wherein stretch and recovery is desired, in whole or in part. These articles can provide the added effect of body shaping and support while providing comfort. The article may be a garment.

Examples of garments that can be produced using the dispersions and methods falling within the scope of the present invention, include but are not limited to: disposable undergarments, brassieres, bralettes, panties, lingerie, swimwear, shapers, camisoles, hosiery, sleepwear, aprons, wetsuits, ties, scrubs, space suits, uniforms, hats, garters, sweatbands, belts, activewear, outerwear, rainwear, cold-weather jackets, pants (including denim jeans), shirtings, dresses, blouses, mens and womens tops, sweaters, corsets, vests, knickers, socks, knee highs, dresses, blouses, aprons, tuxedos, bisht, abaya, hijab, jilbab, thoub, Burka, cape, costumes, diving suit, kilt, kimono, jerseys, gowns, protective clothing, sari, sarong, skirts, spats, stola, suits, straitjacket, toga, tights, towel, uniform, veils, wetsuit, medical compression garments, bandages, suit interlinings, waistbands, and all components therein. In certain embodiments, the garment is a brassiere, a bralette, swimwear (for men or women), shapers or activewear (including leggings, sports bras, shorts and tops).

The aqueous polyurethane dispersion or film may be applied in a predetermined shape and/or to a selected area of a garment. Alternatively, the aqueous polyurethane dispersion or film may be applied into the whole of a garment. The aqueous polyurethane dispersion or film may be applied to a seam or support area of the garment.

After application of the aqueous polyurethane dispersion or shaped article, the garment may exhibit improved moisture transport, comfort, and lighter weight and feel (e.g., when sew-in panels are eliminated) when compared to conventional garments of the same type that do not incorporate the aqueous polyurethane dispersion or shaped article. In addition, unlike some conventional garments that have extra seams, panels sewn-in or bonded, and/or layers of material to create improved hold, the aqueous polyurethane dispersion or shaped article of the present disclosure may be applied directly to the fabric or material of the garment to create the hold, thereby eliminating the need for extra seams, panels and material.

The following examples are meant to be exemplary and not limiting of the embodiments described herein.

EXAMPLES

Representative embodiments of the present invention will be described with reference to the following examples that illustrate the principles and practice of the present invention. In no way is the scope of the invention limited to these representative embodiments. In these examples, the following raw materials were used:

TABLE 1

| Ingredient | Chemical Name | CAS # | Tradename | Vendor |
| --- | --- | --- | --- | --- |
| Glycol | PTMEG | 25190-06-1 | Terathane ® 1800 | INVISTA |
| Isocyanate | Dicyclohexylmethane diisocyanate | 5124-30-1 | Vestanate H12MDI | Evonik |
| DMPA | Dimethylolpropionic Acid | 4767-03-7 | D-MPA | GEO |
| Neutralizer | Triethylamine | 121-44-8 | TEA | BASF |
| Surfactant | Alkyldiphenyloxide Disulfonate | 119345-04-9 | Dowfax 2A1 | Dow |
| Defoamer | mineral oil, silicone oil | Mixture | BYK 012 | BYK Additives & Instruments |
| Antioxidant | hindered phenols | 36443-68-2 | Irganox 245 | BASF |
| Thickener | polyurethane | mixture | Tafigel PUR 61 | Munzing |

The following analytical methods were used in the Examples below where noted: 1) Titration methods; 2) Microwave methods; 3) Brookfield Viscosity, RV Spindle methods #3/10 rpm @ 25° C.

The titration method used for determining the percent isocyanate (% NCO) of the capped glycol prepolymer was carried out according to the method of S. Siggia, "Quantitative Organic Analysis via Functional Group," 3rd Ed., Wiley & Sons, New York, pages 559-561 (1963), using a potentiometric titration. The dispersion solid concentration was determined by a microwave solids analyzer LABWAVE 9000. The dispersion viscosity was determined with a Brookfield Viscometer.

Example 1: Prepolymer Preparation without 1-Hexanol

A polyurethane prepolymer was made using a polytetramethylene ether glycol, an aliphatic diisocyanate such as PICM (4,4'-methylene bis (cyclohexyl isocyanate), a hydrogenated version of 4,4'-MDI) and a diol containing a sterically hindered carboxylic acid group. More specifically, the following ingredients and unit quantities were used to make the prepolymer:

TABLE 2

| Ingredient | CAS Number | Unit Quantity |
|---|---|---|
| Terathane* 1800 | 251090-06-1 | 72.7806 |
| 1-Hexanol | 111-27-3 | 0.0000 |
| Vestanat* H12MDI | 5124-30-1 | 24.7380 |
| DMPA | 4767-03-7 | 2.4814 |
| | Prepolymer total | 100.0000 |

The reaction to prepare the prepolymer was carried out in a moisture-free, nitrogen-blanketed atmosphere to avoid side reactions.

In this example, a 30 gallon reactor, jacketed with hot water and equipped with an agitator, was used. This reactor was heated to a temperature of about 55° C. A pre-determined weight of molten Terathane® 1800 glycol was charged into the reactor. Then, DMPA solid powder was added to the reactor with agitation and circulation, under nitrogen blanket, until the DMPA solid particles were dispersed and dissolved in glycol.

Molten PICM was then charged into the reactor with continuous agitation and the capping reaction was allowed to take place at 90° C. for 240 minutes, still with continuous agitation. The formed viscous prepolymer was then sampled to determine the extent of the reaction by measuring the weight percentage of the isocyanate groups (% NCO) of the prepolymer through a titration method. The theoretical value of the % NCO after the reaction is completed is 2.97 assuming the glycol MW is at 1800. If the determined % NCO value is higher than the theoretical value, the reaction should be allowed to continue until the theoretical value is reached or the % NCO number becomes constant. Once it was determined that the reaction is complete, the prepolymer temperature was maintained between 85 and 90° C.

Example 2: Preparation of Aqueous Polymer Dispersion with Prepolymer of Example 1

The dispersion was prepared by the addition of the prepolymer of Example 1 using a rotor/stator high speed disperser. The prepolymer as made in Example 1 was transferred directly into the disperser head and dispersed under high shear forces into deionized water, containing a surfactant, a neutralizer, an anti-oxidant and a foam control agent. Slightly more prepolymer than required by the dispersion recipe was needed to compensate for loss in the transfer line and in the reactor.

The ingredients for making the dispersion and the composition of the dispersion are shown below in Table 3.

TABLE 3

| Ingredient | CAS Number | Unit Quantity |
|---|---|---|
| Terathane* 1800 | 251090-06-1 | 30.1391 |
| Vestanat* H12MDI | 5124-30-1 | 10.2442 |
| DMPA | 4767-03-7 | 1.0276 |
| 1-Hexanol | 111-27-3 | 0.0000 |
| DI Water | 7732-18-5 | 54.8093 |
| Dowfax 2A1 | 119345-04-9 | 1.2652 |
| Triethylamine | 121-44-8 | 0.7830 |
| Irganox 245 | 36443-68-2 | 0.6051 |
| Tafigel PUR 61 | Mixture | 1.0000 |
| BYK 012 | Mixture | 0.1265 |
| Other | | 0.0000 |
| Total | | 100.0000 |

In making a typical batch of 100 kg of the aqueous polymer dispersion, Dowfax 2A1 surfactant (1.2652 kg), an anti-oxidizer Irganox 245 (0.6051 kg), and foam control agent BYK-012 (0.1265 kg) were mixed and dissolved in the deionized water (54.8093 kg). The triethylamine neutralizer (0.783 kg) was added to the above water mixture 5 minutes prior to the addition of the prepolymer. The prepolymer (41.4109 kg) maintained at a temperature between 85 and 90° C. was added into the water mixture with high speed dispersing. The addition rate (typically at about 1.5 kg/min or about 30 minutes) of the prepolymer should be controlled to allow the formation of uniform dispersion, and the temperature of the dispersion should be kept between 40 and 45° C. Once the addition of prepolymer was complete, mixing was continued for 60 minutes. Then, a thickener Tafigel PUR 61 (1.00 kg) was added and allowed to mix for another 60 minutes. The as-made dispersion was continuously agitated at low speed for 8 hours (or overnight) in the container to eliminate foams and to ensure the reaction had reached completion. The finished dispersion typically contains about 42% solids, with viscosity about 4000 centipoises and pH in the range of 7.0 to 8.5.

The dispersion was then filtered through 100 micron bag filters to remove big particles before packed for shipment. It is recommended to use 55 gallon metal drums with polyethylene liner inside to contain the dispersion for shipment.

Final product specifications were determined as shown in Table 4.

TABLE 4

| Parameters | Aim | ±Limits | Method |
|---|---|---|---|
| Prepolymer % NCO* | 3.00 | 0.10 | Titration |
| Dispersion Solids, % | 44.0 | 2.0 | Microwave |
| Dispersion Viscosity, cps** | 4000 | 1000 | RV Spindle #3/ 10 rpm@25° C. |
| Dispersion pH | 7.7 | 0.7 | |
| Dispersion Filterability | Passing through filter bags no more than 100 microns | | |

*Sampled 20-30 minutes before the prepolymer is dispersed.
**Sampled and measured 24 hours after the dispersion is thickened.

Example 3—Preparation of Prepolymer with 1-Hexanol

The polyurethane prepolymer was made using a polytetramethylene ether glycol, 1-Hexanol, an aliphatic diisocyanate such as PICM (4,4'-methylene his (cyclohexyl isocyanate), a hydrogenated version of 4,4'-MDI) and a diol containing a sterically hindered carboxylic acid group. Table 5 lists the ingredients and unit quantities used to make the prepolymer.

TABLE 5

| Ingredient | CAS Number | Unit Quantity |
| --- | --- | --- |
| Terathane* 1800 | 251090-06-1 | 72.4492 |
| 1-Hexanol | 111-27-3 | 0.4087 |
| Vestanat* H12MDI | 5124-30-1 | 24.6607 |
| DMPA | 4767-03-7 | 2.4814 |
| | Prepolymer total | 100.0000 |

The reaction to prepare the prepolymer was carried out in a moisture-free, nitrogen-blanketed atmosphere to avoid side reactions.

In this example, a 30 gallon reactor, jacketed with hot water and equipped with an agitator, was used. This reactor was heated to a temperature of about 55° C. A pre-determined weight of molten Terathane® 1800 glycol was charged into the reactor. The 1-Hexanol was added second. Then, DMPA solid powder was added to the reactor with agitation and circulation, under nitrogen blanket, until the DMPA solid particles were dispersed and dissolved in glycol.

Molten PICM was then charged into the reactor with continuous agitation and the capping reaction was allowed to take place at 90° C. for 240 minutes, still with continuous agitation. The formed viscous prepolymer was then sampled to determine the extent of the reaction by measuring the weight percentage of the isocyanate groups (% NCO) of the prepolymer through a titration method. The theoretical value of the % NCO after the reaction is completed is 2.80 assuming the glycol MW is at 1800. If the determined % NCO value is higher than the theoretical value, the reaction should be allowed to continue until the theoretical value is reached or the % NCO number becomes constant. Once it was determined that the reaction is complete, maintain the prepolymer temperature between 85 and 90° C.

Example 4: Preparation of Aqueous Polymer Dispersion with Prepolymer of Example 3

The dispersion was prepared by the addition of prepolymer of Example 3 using a rotor/stator high speed disperser. The prepolymer as made in Example 3 was transferred directly into the disperser head and dispersed under high shear forces into deionized water, containing a surfactant, a neutralizer, an anti-oxidant and a foam control agent. Slightly more prepolymer than required by the dispersion recipe is needed to compensate for loss in the transfer line and in the reactor.

Table 6 lists the ingredients used in making the dispersion and the composition of the dispersion.

TABLE 6

| Ingredient | CAS Number | Unit Quantity |
| --- | --- | --- |
| Terathane* 1800 | 251090-06-1 | 30.0000 |
| Vestanat* H12MDI | 5124-30-1 | 10.2116 |
| DMPA | 4767-03-7 | 1.0275 |
| 1-Hexanol | 111-27-3 | 0.1692 |
| DI Water | 7732-18-5 | 54.8083 |
| Dowfax 2A1 | 119345-04-9 | 1.2652 |
| Triethylamine | 121-44-8 | 0.7866 |
| Irganox 245 | 36443-68-2 | 0.6051 |
| Tafigel PUR 61 | Mixture | 1.0000 |
| BYK 012 | Mixture | 0.1265 |
| Other | | 0.0000 |
| | Total | 100.0000 |

In making a typical batch of this 10 kg dispersion Dowfax 2A1 surfactant (1.2652 kg), an anti-oxidizer Irganox 245 (0.6051 kg), and foam control agent BYK-012 (0.1265 kg) were mixed and dissolved in the deionized water (54.8083 kg). The triethylamine neutralizer (0.7866 kg) was added to the above water mixture 5 minutes prior to the addition of the prepolymer. The prepolymer (41.4083 kg) maintained at a temperature between 85 and 90° C. was added into the water mixture with high speed dispersing. The addition rate (typically at about 1.5 kg/min or about 30 minutes) of the prepolymer should be controlled to allow the formation of uniform dispersion, and the temperature of the dispersion should be kept between 40 and 45° C. Once the addition of prepolymer was complete, mixing was continued for 60 minutes. Then, a thickener Tafigel PUR 61 (1.00 kg) was added and allowed to mix for another 60 minutes. The as-made dispersion was continuously agitated at low speed for 8 hours (or overnight) in the container to eliminate foams and to ensure the reaction had reached completion. The finished dispersion typically contains about 42% solids, with viscosity about 4000 centipoises and pH in the range of 7.0 to 8.5.

The dispersion is then filtered through 100 micron bag filters to remove big particles before packed for shipment. It is recommended to use 55 gallon metal drums with vented caps, and with a polyethylene liner inside to contain the dispersion for shipment.

Final product specifications were determined as shown in Table 7.

TABLE 7

| Parameters | Aim | ±Limits | Method |
| --- | --- | --- | --- |
| Prepolymer % NCO* | 2.80 | 0.10 | Titration |
| Dispersion Solids, % | 44.0 | 2.0 | Microwave |
| Dispersion Viscosity, cps** | 4000 | 1000 | RV Spindle #3/ |
| Dispersion pH | 7.7 | 0.7 | 10 rpm@25° C. |
| Dispersion Filterability | | Passing through filter bags no more than 100 microns | |

*Sampled 20-30 minutes before the prepolymer is dispersed
**Sampled and measured 24 hours after the dispersion is thickened.

Example 5: Comparison of Whiteness Retention

An experiment was conducted to compare the whiteness retention (or "non-yellowing") of aqueous polyurethane dispersions of the disclosure with other dispersions. For each dispersion, a sample was prepared by casting a film on a Mylar sheet with a 10 mil knife and then dried in a nitrogen box. The film samples were exposed to different conditions and whiteness CIE data was collected after each exposure period. The exposure conditions were thermal (195° C. for five minutes), UV (8 hours), fume (24 hours) and $NO_2$ (24 hours). The thermal exposure test was conducted in a thermal chamber (Werner-Mathis AG, Typ-Nr., LTF 117187) in heated air. The UV exposure test was conducted in Atlas Weather-Ometer® equipped with an Xenon Arc lamp simulating the exposure to daylight, including W. The NO₂ exposure test was conducted in Atlas Weather-Ometer® in nitrogen oxides atmosphere. For each sample, the color of the film before and after exposure was compared; the lower the reduction in CIE, the better the whiteness retention.

Aqueous polyurethane dispersions, i.e., Examples 50-59, were prepared according to the compositional makeups shown in Tables 8 and 9.

TABLE 8

| | Part Number | | | | |
|---|---|---|---|---|---|
| | Ex. 50 (D71206) | Ex. 51 (D71207) | Ex. 52 (D80102) | Ex. 53 (D80110) | Ex. 54 (D80111) |
| NCO/OH Ratio | 1.3726 | 1.3726 | 1.5300 | 1.3726 | 1.3700 |
| Meq Acid/kg CG | 184.5 | 183.6 | 220.0 | 183.6 | 185.0 |
| Meq Monol/kg | | | | | |
| CG | 0.00 | 48.20 | 40.00 | 48.20 | 40.00 |
| Mw | | | 49450 | 48400 | 46300 |
| Mn | | | 18050 | 15600 | 16600 |
| Prepolymer: Capped Glycol Recipe, Batch Wt, g | 1010.16 | 1200 | 1200 | 1200 | 1200 |
| T-1800 Glycol, g | 765.00 | 904.29 | 861.59 | 904.29 | 904.85 |
| PICM, g | 220.16 | 260.25 | 298.10 | 260.25 | 260.47 |
| DMPA, g | 25.00 | 29.55 | 35.41 | 29.55 | 29.78 |
| Hexanol, g | 0.00 | 5.91 | 4.90 | 5.91 | 4.90 |
| Capping Temp., ° C. | 90 | 90 | 90 | 90 | 90 |
| Capping Time, min | 120 | 120 | 180 | 180 | 180 |
| FBV Measured | 1175 | 1070 | 1040 | 1787 | 1632 |
| Dispersion Recipe | | | | | |
| Capped glycol dispersed, g | 575.00 | 701.00 | 681.00 | 693.00 | 704.00 |
| DI Water, g | 1000.00 | 1000.00 | 1000.00 | 1000.00 | 1000.00 |
| Nacconol 90G, g | 20.00 | 20.00 | 20.00 | 20.00 | 20.00 |
| TEA, g | 12.67 | 12.67 | 12.67 | 12.67 | 12.67 |
| DeFoo 3000, g | 1.00 | 1.00 | 1.00 | 1.00 | 1.00 |
| Silicone 65, g | 5.00 | 5.00 | 5.00 | 5.00 | 5.00 |
| Other, g | 0.00 | 0.00 | 0.00 | 0.00 | 0.00 |
| Acrysol RM-8W, g | 35.00 | 35.00 | 35.00 | 35.00 | 35.00 |
| Irganox 245, g | 10.70 | 10.70 | 10.70 | 10.70 | 10.70 |
| Total Weight, g | 1659.37 | 1785.37 | 1765.37 | 1777.37 | 1788.37 |

TABLE 9

| | Part Number | | | | |
|---|---|---|---|---|---|
| | Ex. 55 (D0118) | Ex. 56 (D80125) | Ex. 57 (D80129) | Ex. 58 (D80208) | Ex. 59 (D80212) |
| NCO/OH Ratio | 1.3700 | 1.5300 | 1.5300 | 1.5300 | 1.3700 |
| Meq Acid/kg CG | 185.0 | 185.0 | 185.0 | 220.0 | 155.0 |
| Meq Monol/kg | | | | | |
| CG | 50.00 | 40.00 | 50.00 | 50.00 | 30.00 |
| Mw | 51000 | 50200 | 41700 | | |
| Mn | 16400 | 19000 | 15600 | | |
| Prepolymer: Capped Glycol Recipe, Batch Wt, g | 1200 | 1200 | 1200 | 1200 | 1200 |
| T-1800 Glycol, g | 903.83 | 879.98 | 878.97 | 860.58 | 920.68 |
| PICM, g | 260.27 | 285.34 | 285.12 | 297.88 | 250.69 |
| DMPA, g | 29.78 | 29.78 | 29.78 | 35.41 | 24.95 |
| Hexanol, g | 6.13 | 4.90 | 6.13 | 6.13 | 3.68 |
| Capping Temp., ° C. | 90 | 90 | 90 | 90 | 90 |
| Capping Time, min | 180 | 180 | 180 | 180 | 180 |
| FBV Measured | 1441 | 1073 | 1271 | 1171 | 1478 |
| Dispersion Recipe | | | | | |
| Capped glycol dispersed, g | 700.00 | 735.00 | 707.00 | 699.00 | 689.00 |
| DI Water, g | 1000.00 | 1000.00 | 1000.00 | 1000.00 | 1000.00 |
| Nacconol 90G, g | 20.00 | 20.00 | 20.00 | 20.00 | 20.00 |

TABLE 9-continued

| | Part Number | | | | |
|---|---|---|---|---|---|
| | Ex. 55 (D0118) | Ex. 56 (D80125) | Ex. 57 (D80129) | Ex. 58 (D80208) | Ex. 59 (D80212) |
| TEA, g | 12.67 | 12.67 | 12.67 | 12.67 | 12.67 |
| DeFoo 3000, g | 1.00 | 1.00 | 1.00 | 1.00 | 1.00 |
| Silicone 65, g | 5.00 | 5.00 | 5.00 | 5.00 | 5.00 |
| Other, g | 0.00 | 0.00 | 0.00 | 0.00 | 0.00 |
| Acrysol RM-8W, g | 35.00 | 35.00 | 35.00 | 35.00 | 35.00 |
| Irganox 245, g | 10.70 | 10.70 | 10.70 | 10.70 | 10.70 |
| Total Weight, g | 1784.37 | 1819.37 | 1791.37 | 1783.37 | 1773.37 |

Comparative dispersions, F-70 and F-120, were also made according to the compositional makeups shown in Tables 10 through 13.

TABLE 10

F-70 Prepolymer Composition

| Ingredient | CAS Number | Unit Quantity |
|---|---|---|
| Terathane* 1800 | 251090-06-1 | 76.1886 |
| 1-Hexanol | 111-27-3 | 0.4070 |
| Mondur* ML | 26447-40-5 | 20.9145 |
| DMPA | 4767-03-7 | 2.4898 |
| | | 100.0000 |

TABLE 11

F-70 Dispersion Composition

| Ingredient | CAS Number | Unit Quantity |
|---|---|---|
| Terathane* 1800 | 251090-06-1 | 29.9387 |
| Mondur* ML | 26447-40-5 | 8.2185 |
| DMPA | 4767-03-7 | 0.9784 |
| DI Water | 7732-18-5 | 56.8384 |
| Nacconol 90G | 25155-30-0 | 1.1510 |
| Triethylamine | 121-44-8 | 0.7482 |
| 1-Hexanol | 111-27-3 | 0.1606 |
| Additive 65 (Dow) | mixture | 0.2896 |
| DeFoo 3000 | mixture | 0.0609 |
| Acrysol RM-8W | mixture | 1.0000 |
| Irganox 245 | 36443-68-2 | 0.6157 |
| TOTAL | | 100.0000 |

Note:
The amount of Acrysol RM-8W may be adjusted to achieve desired dispersion viscosity aim.

TABLE 12

F-120 Prepolymer Composition

| Ingredient | CAS Number | Unit Quantity |
|---|---|---|
| Terathane* 1800 | 251090-06-1 | 76.5000 |
| 1-Hexanol | 111-27-3 | 0.0000 |
| Mondur* ML | 26447-40-5 | 21.0000 |
| DMPA | 4767-03-7 | 2.5000 |
| | | 100.0000 |

TABLE 13

F-120 Dispersion Composition

| Ingredient | CAS Number | Unit Quantity |
|---|---|---|
| Terathane* 1800 | 251090-06-1 | 29.9387 |
| Mondur* ML | 26447-40-5 | 8.2185 |
| DMPA | 4767-03-7 | 0.9784 |
| DI Water | 7732-18-5 | 56.9990 |
| Nacconol 90G | 25155-30-0 | 1.1510 |
| Triethylamine | 121-44-8 | 0.7482 |
| 1-Hexanol | 111-27-3 | 0.0000 |
| Additive 65 (Dow) | mixture | 0.2896 |
| DeFoo 3000 | mixture | 0.0609 |
| Acrysol RM-8W | mixture | 1.0000 |
| Irganox 245 | 36443-68-2 | 0.6157 |
| TOTAL | | 100.0000 |

Note:
The amount of Acrysol RM-8W may be adjusted to achieve desired dispersion viscosity aim.

The product specifications for these comparative dispersions (F-10 and F-120) are included in Table 14.

TABLE 14

| Parameters | Aim | ±Limits |
|---|---|---|
| Prepolymer % NCO | 1.91 | 0.25 |
| Dispersion Solids, % | 40.0 | 1.0 |
| Dispersion Viscosity, cps | 3000 | 500 |
| Dispersion pH | 7.7 | 0.7 |
| Dispersion Filterability | grits large than 400 microns below 2.5 wt % of the total solids | |

The difference in CIE whiteness index values before and after exposure (i.e., the results of whiteness retention) are shown in Tables 15 (thermal), 16 (UV) and 17 (fume).

TABLE 15

| Sample Part | As Is CIE avg | Thermal 1 Min | Thermal 2 Min | Thermal 3 Min | Thermal 4 Min | Thermal 5 Min | Thermal Delta |
|---|---|---|---|---|---|---|---|
| Bemis 3410 | 53.28 | 58.53 | 57.68 | 58.01 | 57.47 | 57.27 | 3.99 |
| LYCRA ® T162C | 52.87 | 56.85 | 55.57 | 55.89 | 54.97 | 55.04 | 2.17 |
| LYCRA ® T162C | 53.01 | | | | | | |
| F-120 | 49.21 | 46.83 | 42.03 | 37.01 | 30.27 | 23.81 | −25.40 |
| F-70 | 41.26 | 38.31 | 31.97 | 23.25 | 14.61 | 6.12 | −35.14 |
| Ex. 52 (D80102) | 55.29 | 56.13 | 52.49 | 47.59 | 43.11 | 37.74 | −17.56 |
| Ex. 53 (D80110) | 52.25 | 55.85 | 52.45 | 46.41 | 40.11 | 35.68 | −16.57 |
| Ex. 54 (D80111) | 53.35 | | | | | | |
| Ex. 55 (D80118) | 52.98 | | | | | | |
| Ex. 56 (D80125) | 55.71 | 56.55 | 52.71 | 49.47 | 43.57 | 37.03 | −18.68 |
| Ex. 57 (D80129) | 56.38 | 56.44 | 52.84 | 47.95 | 43.51 | 36.46 | −19.92 |
| Ex. 58 (D80208) | 56.88 | 55.35 | 51.35 | 46.77 | 41.94 | 37.36 | −19.52 |
| Ex. 59 (D80212) | 51.56 | | | | | | |
| Mylar control | 54.81 | 56.99 | 58.47 | 58.04 | 57.51 | 57.26 | 2.45 |

TABLE 16

| Sample Part | UV 2 Hr | UV 4 Hr | UV 8 Hr | UV Delta |
|---|---|---|---|---|
| Bemis 3410 | 58.18 | 57.44 | 57.81 | 4.53 |
| LYCRA ® T162C | 57.86 | 57.86 | 57.58 | 4.71 |
| LYCRA ® T162C | 57.86 | 57.86 | 58.42 | 5.41 |
| F-120 | 33.08 | 25.66 | 18.87 | −30.34 |
| F-70 | 34.14 | 34.14 | 29.29 | −11.97 |
| Ex. 52 (D80102) | 54.45 | 54.92 | 55.85 | 0.55 |
| Ex. 53 (D80110) | 57.25 | 57.31 | 58.49 | 6.25 |
| Ex. 54 (D80111) | | | | |
| Ex. 55 (D80118) | | | | |
| Ex. 56 (D80125) | 55.11 | 55.15 | 56.22 | 0.51 |
| Ex. 57 (D80129) | | | | |
| Ex. 58 (D80208) | 54.19 | 54.19 | 55.62 | −1.26 |
| Ex. 59 (D80212) | 55.21 | 55.21 | 55.24 | 3.68 |
| Mylar control | 58.64 | 59.27 | 59.93 | 5.12 |

TABLE 17

| Sample Part | NO2 8 Hr | NO2 16 Hr | NO2 24 Hr | NO2 Delta | Fume 8 Hr | Fume 16 Hr | Fume 24 Hr | Fume Delta |
|---|---|---|---|---|---|---|---|---|
| Bemis 3410 | 58.74 | 58.40 | 53.67 | 0.39 | | | | |
| LYCRA ® T162C | | | | | | | | |
| LYCRA ® T162C | 58.54 | 59.01 | 51.00 | −2.01 | | | | |
| F-120 | | | | | | | | |
| F-70 | 32.68 | 21.38 | 5.85 | −35.41 | | | | |
| Ex. 52 (D80102) | | | | | | | | |
| Ex. 53 (D80110) | | | | | | | | |
| Ex. 54 (D80111) | 57.71 | 57.71 | 51.21 | −2.14 | 51.76 | 54.47 | 52.92 | −0.43 |
| Ex. 55 (D80118) | 57.94 | 56.88 | 55.08 | 2.11 | 53.23 | 52.16 | 49.12 | −3.86 |
| Ex. 56 (D80125) | 56.15 | 55.77 | 55.38 | −0.33 | | | | |
| Ex. 57 (D80129) | 56.46 | 55.81 | 56.2 | −0.18 | 53.62 | 51.99 | 48.85 | −7.53 |
| Ex. 58 (D80208) | | | | | 53.67 | 52.47 | 49.99 | −6.89 |
| Ex. 59 (D80212) | 57.69 | 58.11 | 56.93 | 5.37 | | | | |
| Mylar control | 57.30 | 59.43 | 59.06 | 4.25 | 59.58 | 59.10 | 58.70 | 3.89 |

Figure 21:
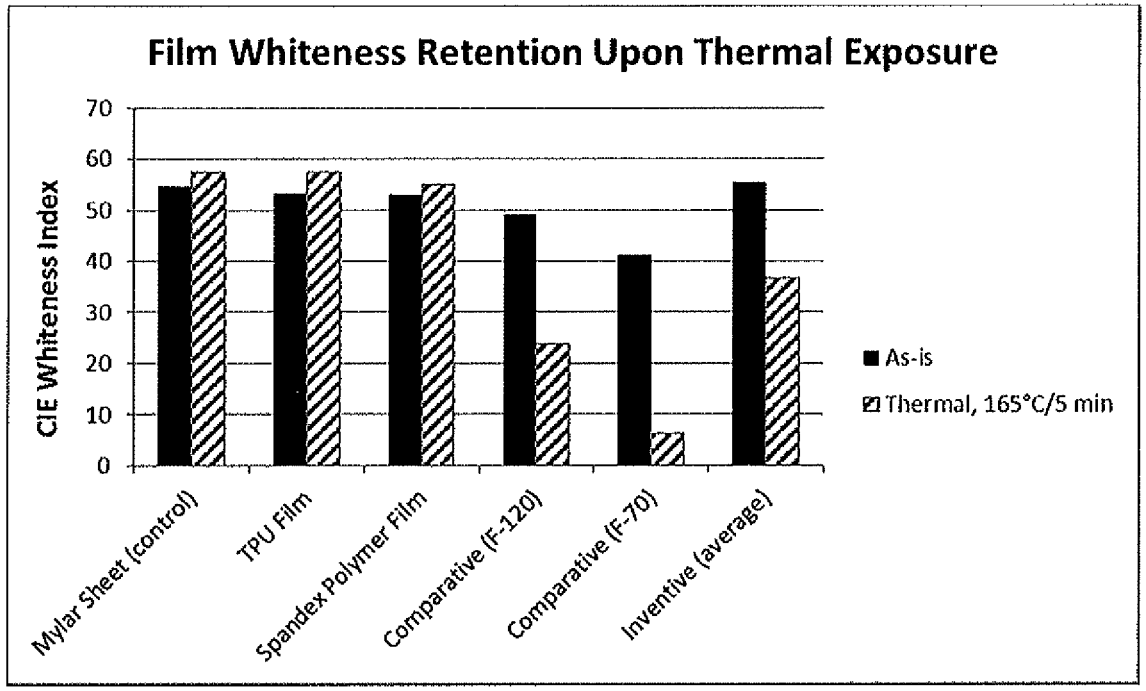
FIG. 21 is a bar graph depicting film whiteness retention for six film samples after thermal exposure.
Figure 22:
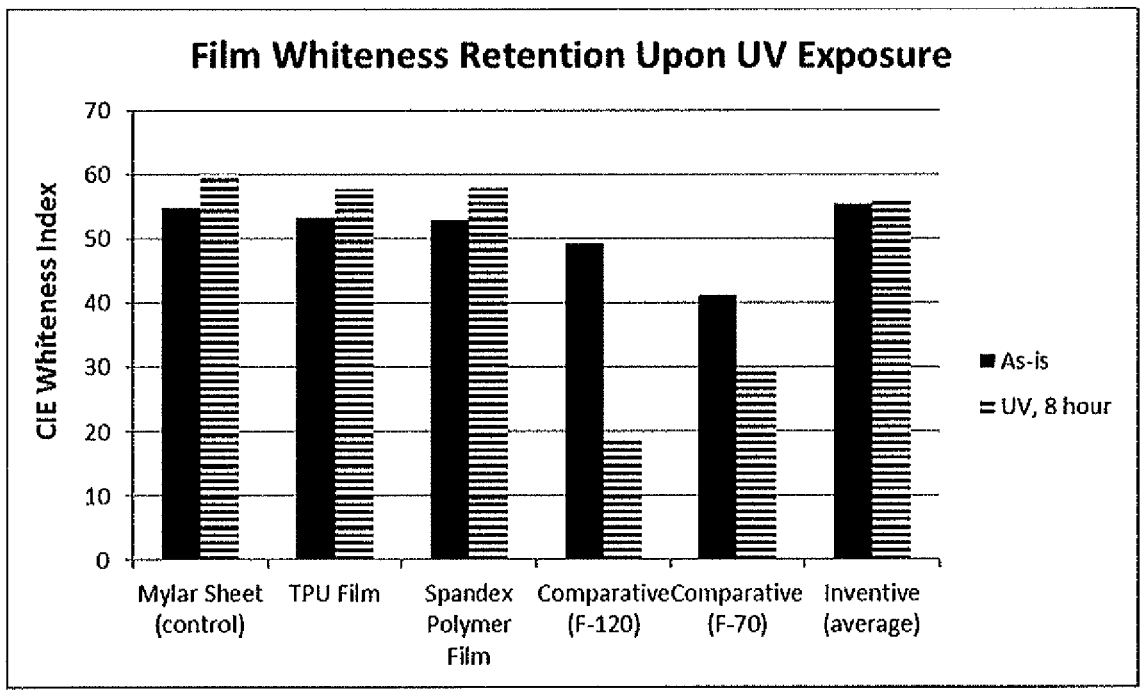
FIG. 22 is a bar graph depicting film whiteness retention for six film samples after UV exposure.
Figure 23:
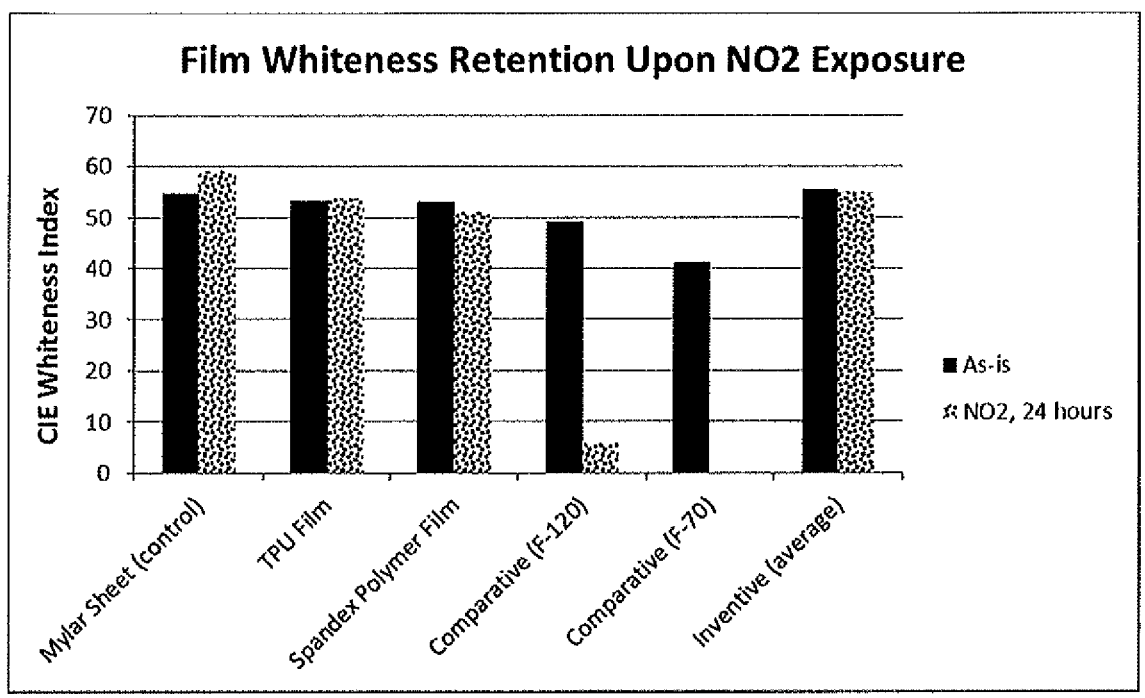
FIG. 23 is a bar graph depicting film whiteness retention for six film samples after $NO_2$ exposure.

The results of the whiteness retention test are graphically depicted in FIGS. 21 through 23. "Inventive (average)" is an average of Examples 50-59. For comparison, TPU Film, which is a commercially extruded film (Bemis 3410), and a conventional commercially available Spandex Polymer Film (LYCRA® T162C) is included, as well as the results of samples prepared using comparative formulas F-70 and F-120, which were films cast from polyurethane dispersions with aromatic diisocyanates.

The films made from dispersions of the present disclosure (Inventive (average)) showed better whiteness retention than films of F-70 and F-120, especially after UV and $NO_2$ exposures. This is expected to be due to inclusion of an aliphatic diisocyanate (i.e., PICM) in the compositions of the present disclosure, as opposed to an aromatic isocyanate (i.e., Mondur® ML) in F-70 and F-120.

Film properties are included in Tables 18 and 19.

TABLE 18

| Sample Part | NCO/OH Ratio* | Meq Acid/kg CG | Meq Monol/kg CG | TP1 (g/den) | TP2 (g/den) | TP301 (g/den) | TP3 (g/den) | DEC (%) |
|---|---|---|---|---|---|---|---|---|
| Ex. 54 (D80111) | 1.3700 | 185.0 | 40.00 | 0.0062 | 0.0064 | 0.0066 | 0.0033 | 33.46 |
| Ex. 52 (D80102) | 1.5300 | 220.0 | 40.00 | 0.0133 | 0.0163 | 0.0195 | 0.0097 | 20.28 |
| Ex. 55 (D80118) | 1.3700 | 185.0 | 50.00 | 0.0062 | 0.0062 | 0.0062 | 0.0028 | 38.82 |
| Ex. 57 (D80129) | 1.5300 | 185.0 | 50.00 | 0.0107 | 0.0123 | 0.0139 | 0.0078 | 24.79 |
| Ex. 56 (D80125) | 1.5300 | 185.0 | 40.00 | 0.0108 | 0.0137 | 0.0166 | 0.0095 | 24.52 |
| Ex. 58 (D80208) | 1.5300 | 220.0 | 50.00 | 0.0109 | 0.0131 | 0.0154 | 0.0086 | 25.30 |
| Ex. 59 (D80212) | 1.3700 | 155.0 | 30.00 | 0.0049 | 0.0055 | 0.0059 | 0.0021 | 39.68 |
| F-120 | 1.373 | 184.5 | 0.00 | 0.0193 | 0.0256 | 0.0358 | 0.0223 | 11.11 |
| F-70 | 1.370 | 185.0 | 40.00 | 0.0137 | 0.0173 | 0.0220 | 0.0112 | 13.01 |

*Excluding OH from monol terminator.

TABLE 19

| Sample Part | TM2 (g/den) | TM1 (g/den) | ELO (%) | TEN (g/den) | SET (%) |
|---|---|---|---|---|---|
| Ex. 54 (D80111) | 0.0008 | 0.0000 | 1000.00 | 0.0098 | 98.35 |
| Ex. 52 (D80102) | 0.0034 | 0.0001 | 620.02 | 0.0330 | 88.10 |
| Ex. 55 (D80118) | 0.0004 | 0.0000 | 187.76 | 0.0062 | 80.71 |
| Ex. 57 (D80129) | 0.0028 | 0.0000 | 854.44 | 0.0499 | 154.25 |
| Ex. 56 (D80125) | 0.0033 | 0.0004 | 699.11 | 0.0469 | 256.71 |
| Ex. 58 (D80208) | 0.0029 | 0.0000 | 733.00 | 0.0384 | 113.54 |
| Ex. 59 (D80212) | 0.0003 | 0.0000 | 999.44 | 0.0064 | 129.57 |
| F-120 | 0.0104 | 0.0062 | 618.78 | 0.1332 | 26.64 |
| F-70 | 0.0045 | 0.0016 | 586.56 | 0.0281 | 46.81 |

The abbreviations used in Tables 18 and 19 have the following meanings:

Meq is the milliequivalent of the specific functional groups, such as carboxylic acid or hydroxyl terminating groups. For dispersions of the present disclosure, they are expressed as milliequivalent per kg of the prepolymer or capped glycol (CG).

TP1, TP2, TP301, TP3 represent the load power. This is the force when a film sample is stretched to a certain percentage in a specific stretch (0-300%) cycle. TP1 means that the film is stretched to 100%. TP2 means the stretch force (also called load power) that the film is stretched to 200% in the first 0 to 300% stretch cycles. TP301 means that the film is stretched to 300% in the first stretch cycle. TP3 means that the film is stretched to 300% in the fifth stretch cycle.

DEC is a stress decay measurement. When the film sample is stretched for the $5^{th}$ time to 300% elongation, this determines the force (5TP300). When the sample is held at this elongation for 30 seconds, the force will drop due to stress relaxation. The force data collected after holding for 30 seconds, right before releasing the tension for recovery, is 5TM300.

DEC=(5TP300−5TM300)×100/5TP300

TM2 is the recovery force (also called unload power) of the film sample measured at 200% elongation in the $5^{th}$ 0 to 300% stretch cycle.

TM1 is the recovery force or unload power of the film sample after DEC measurement, measured at 100% elongation in the $5^{th}$ stretch cycle.

ELO is the break elongation when the film sample is stretched in the sixth cycle.

TEN is the tensile strength or tenacity when the film sample is stretched in the sixth cycle.

SET is the unrecovered set after 5 stretch cycles when the recovery force of the film sample reaches to zero.

Because the film samples had different thicknesses, the force data was normalized in terms of grams per denier.

Example 6: Comparison of Tensile Strength

An experiment was conducted to improve the tensile strength of films made from aqueous polyurethane dispersions of the disclosure and compare them with comparative examples, F-70 and F-120.

As shown in Table 20 (which reconfigures data presented in Tables 18 and 19 above), under the same compositional control parameters, films made from F-70 and F-120 had better balanced tensile properties (higher load and unload power, higher tenacity) than films of the present disclosure.

TABLE 20

| Sample Part | NCO/OH Ratio | Meq Acid/kg CG | Meq Monol/kg CG | TP2 (g/den) | DEC (%) | TM2 (g/den) | TEN (g/den) | SET (%) |
|---|---|---|---|---|---|---|---|---|
| Ex. 54 | 1.3700 | 185.0 | 40.00 | 0.0064 | 33.46 | 0.0008 | 0.0098 | 98.35 |
| Ex. 55 | 1.3700 | 185.0 | 50.00 | 0.0062 | 38.82 | 0.0004 | 0.0062 | 80.71 |
| Ex. 59 | 1.3700 | 155.0 | 30.00 | 0.0055 | 39.68 | 0.0003 | 0.0064 | 129.57 |
| F-120 | 1.373 | 184.5 | 0.00 | 0.0256 | 11.11 | 0.0104 | 0.1332 | 26.64 |
| F-70 | 1.370 | 185.0 | 40.00 | 0.0173 | 13.01 | 0.0045 | 0.0281 | 46.81 |

New samples as shown in Table 21 were prepared modifying the NCO/OH ratio and amount of monol terminator (Meq Monol/kg CG). After testing the tensile strength of these new samples (Examples 60-65), it was found that the tensile performance improved with an increase in NCO/OH ratio over 1.370 and/or reduced terminator (Meq Monol/kg CG).

Meq Acid or Mortal/kg CG, Denier, TP, DEC, TM, ELO, TEN, and SET in Tables 22 and 23 have the same meanings as above in Tables 18 and 19. In addition, for example, 1TP100 means that the film is stretched to 100% or 2 times of its original length in the first (0-300%) stretch cycle; 5TP200 means that the film sample is stretched to 200% or 3 times of its original length in the fifth (0-300%) stretch cycle. After stretching for 5 cycles, the film sample is stretched again all the way until it is broken.

As shown in the data presented in Tables 22 and 23, it was found that the best tensile properties for films of the present disclosure were made from dispersions having NCO/OH ratios in between 1.50 to 1.90, with the polymer number average molecular weight larger than 10,000. When the NCO/OH ratios were below 1.50, the films had inadequate power (stretch/recovery), and when the NCO/OH ratios were above 1.90 the films were brittle with low elongation.

TABLE 21

| Part Number | Ex. 60 (D160317) | Ex. 61 (D160318) | Ex. 62 (D160322) | Ex. 63 (D160318-2) | Ex. 64 (D160329) | Ex. 65 (D160331) |
|---|---|---|---|---|---|---|
| NCO/OH Ratio | 1.6000 | 1.5000 | 1.8000 | 1.5000 | 1.9000 | 2.0000 |
| % NCO Aim | 2.9717 | 2.5060 | 3.8707 | 2.5060 | 4.3049 | 4.7292 |
| Meq Acid/kg CG | 185.0 | 185.0 | 185.0 | 185.0 | 185.0 | 185.0 |
| Meq Monol/kg CG | 0.00 | 0.00 | 0.00 | 0.00 | 0.00 | 0.00 |
| pH | pH--6.56 | pH--6.60 | pH--6.95 | pH--7.50 | pH--6.72 | pH--6.76 |
| Prepolymer: Capped Glycol Recipe, Batch Wt, g | 1200 | 1200 | 1200 | 1200 | 1200 | 1200 |
| T-1800 Glycol, g | 873.37 | 888.59 | 843.97 | 888.59 | 829.78 | 815.90 |
| PICM, g | 296.86 | 281.63 | 326.25 | 281.63 | 340.45 | 354.32 |
| DMPA, g | 29.78 | 29.78 | 29.78 | 29.78 | 29.78 | 29.78 |
| Hexanol, g | 0.00 | 0.00 | 0.00 | 0.00 | 0.00 | 0.00 |
| Catalyst, mg | 0.00 | 0.00 | 0.00 | 0.00 | 0.00 | 0.00 |
| Capping Temp., ° C. | 90 | 90 | 90 | 90 | 90 | 90 |
| Capping Time, min | 240 | 240 | 240 | 240 | 240 | 240 |
| FBV Measured | 1749 | 1208 | 1047 | 3164 | 779 | 568 |
| Dispersion Recipe | | | | | | |
| Capped glycol dispersed, g | 746.60 | 802.60 | 759.30 | 714.90 | 779.00 | 779.10 |
| DI Water, g | 1000.00 | 1000.00 | 1000.00 | 1000.00 | 1000.00 | 1000.00 |
| Dowfax 2A1, g | 23.00 | 23.00 | 23.00 | 23.00 | 23.00 | 23.00 |
| TEA, g | 14.12 | 14.12 | 14.12 | 14.12 | 14.12 | 14.12 |
| BYK 012, g | 2.30 | 2.30 | 2.30 | 2.30 | 2.30 | 2.30 |
| Silicone 65, g | 0.00 | 0.00 | 0.00 | 0.00 | 0.00 | 0.00 |
| Other, g | 0.00 | 0.00 | 0.00 | 0.00 | 0.00 | 0.00 |
| Thickener, g | 18.50 | 18.50 | 18.50 | 18.50 | 18.50 | 18.50 |
| Irganox 245, g | 11.00 | 11.00 | 11.00 | 11.00 | 11.00 | 11.00 |
| Total Weight, g | 1818.92 | 1871.52 | 1828.22 | 1783.82 | 1847.92 | 1848.02 |
| Calculated Total Solids, wt % | 43.88 | 45.46 | 44.16 | 42.77 | 44.76 | 44.76 |

TABLE 22

| Part | NCO/OH Ratio | Meq Acid/kg CG | Meq Monol/kg CG | 1TP100 (g/den) | 1TP200 (g/den) | 1TP300 (g/den) | 5TP100 (g/den) | 5TP200 (g/den) | 5TP300 (g/den) |
|---|---|---|---|---|---|---|---|---|---|
| Ex. 63 | 1.500 | 185.0 | 0.00 | 0.0223 | 0.0300 | 0.0420 | 0.0144 | 0.0214 | 0.0307 |
| Ex. 60 | 1.600 | 185.0 | 0.00 | 0.0266 | 0.0380 | 0.0592 | 0.0164 | 0.0251 | 0.0397 |
| Ex. 62 | 1.800 | 185.0 | 0.00 | 0.0354 | 0.0530 | 0.0911 | 0.0189 | 0.0306 | 0.0585 |
| Ex. 64 | 1.900 | 185.0 | 0.00 | 0.0394 | 0.0605 | 0.1311 | ** | ** | ** |
| Ex. 65 | 2.000 | 185.0 | 0.00 | *** | *** | *** | *** | *** | *** |
| F-120 | 1.373 | 184.5 | 0.00 | 0.0193 | 0.0256 | 0.0358 | | 0.0223 | |
| F-70 | 1.370 | 185.0 | 40.00 | 0.0137 | 0.0173 | 0.0220 | | 0.0112 | |

**Film stripes were broken before completing the 5 stretch cycles of 0-300%.
***Film was too rigid to be peeled off back paper with good enough quality for the instron test.

TABLE 23

| Part | NCO/OH Ratio | DEC (%) | TM2 (g/den) | TM1 (Olen) | ELO (A) | TEN (g/den) | SET (%) |
|---|---|---|---|---|---|---|---|
| Ex. 63 | 1.500 | 16.34 | 0.0144 | 0.0094 | 522.80 | 0.1810 | 21.84 |
| Ex. 60 | 1.600 | 20.00 | 0.0156 | 0.0104 | 494.83 | 0.2191 | 21.57 |
| Ex. 62 | 1.800 | 24.83 | 0.0171 | 0.0107 | 406.67 | 0.1543 | 24.60 |
| Ex. 64 | 1.900 | ** | ** | ** | ** | ** | ** |
| Ex. 65 | 2.000 | *** | *** | *** | *** | *** | *** |
| F-120 | 1.373 | 11.11 | 0.0104 | 0.0062 | 618.78 | 0.1332 | 26.64 |
| F-70 | 1.370 | 13.01 | 0.0045 | 0.0016 | 586.56 | 0.0281 | 46.81 |

**Film stripes were broken before completing the 5 stretch cycles of 0-300%.
***Film was too rigid to be peeled off back paper with good enough quality for the instron test.

Example 7: IMPROVED CHLORINE RESISTANCE

An experiment was conducted to evaluate chlorine resistance of fabrics to which an aqueous dispersion of the present disclosure has been applied. The fabrics were tested for durability of stretch and recovery properties to chlorine exposure according to the following procedure. Chlorinated water conditions (also referred to as a chlorinated environment, to simulate a conventional chlorinated pool) were created by maintaining a water bath at 25° C., pH at 7.5, and an activated chlorine level at 3.5 ppm. The fabric samples are then fully submerged in the water bath, while they were continuously stretched from 0 to 40% at a rate of 24 times per minute for a period of 240 hours. Three times each hour, the amount of load in grams required to elongate the fabric to 40% was measured and recorded. At the end of a 240 hour exposure, the percentage change between the starting load at 0 hours and the load at other measured time periods (e.g., after 180 hours of submersion) was calculated. Additionally, after the fabrics were removed from the chlorine bath and allowed to air dry until dry to the touch, the fabrics were visually inspected for breakage or integrity of the applied and dried aqueous dispersion.

A circular knit fabric (Fabric A) was produced on a 28GG machine by combining 69% of a 40 denier-34 filament Nylon 6,6 yarn and 31% of a 55 denier spandex (LYCRA® fiber type 275Z). The fabric was made using conventional textile processing. A sample of this fabric was treated with an aqueous polyurethane dispersion of Example 2 above by conventional screen printing, followed by a curing step in which the fabric was heated to 160° C. for 60 seconds.

Performance and chlorine resistance of the fabric with and without application of the inventive aqueous polyurethane dispersion are shown in Table 25 below. Specifically, Table 25 shows the load (or fabric modulus) to 40% elongation at certain time intervals after submersion in the chlorinated environment. As shown Table 25, after application and curing of the dispersion, the fabric modulus to 40% elongation increased by 43% (from 505 g to 723 g). After testing the modulus of the samples after chorine exposure at different tested time periods, the stretch force in fabric with the dispersion ("Fabric A PLUS") compared to the stretch force in Fabric A was always 30% or more greater. At 180 hours, the increase in fabric modulus between the samples was measured as 41%, which is almost the same as the initial measured difference at 0 hours of 43%.

At 180 hours, the fabric modulus to 40% elongation increased by 41% after exposure to the chlorinated conditions (from 320 g to 453 g). This confirms an unexpected superior commercial purpose and use of the inventive aqueous polyurethane dispersion to increase modulus in a durable manner in a chlorinated environment.

After 180 hours in the chlorinated bath, Fabric A PLUS and the untreated sample of Fabric A show the same 63% decrease on an absolute basis in load to elongate. This confirms that the performance of the fabric is unchanged, on a percentage basis, between the two samples. Taken together, these results are particularly surprising considering that the dispersion did not contain additional technologies, such as those described in U.S. Pat. No. 5,626,960, which are known in the art to improve the resistance of polyurethane based materials to property degradation from exposure to activated chlorine. It is understood that should one desire to improve the performance even further, one may also include an additive, such as those described in U.S. Pat. No. 5,626,960.

TABLE 25

Load to Elongate 40% of Fabric Samples in Chlorinated Environment

| Fabric Sample | Load to Elongate 40% (g)-0 hr | 20 hr | 60 hr | 100 hr | 140 hr | 180 hr | % decrease of load after 180 hrs in chlorine environment |
|---|---|---|---|---|---|---|---|
| Fabric A (Control) | 505 | 493 | 484 | 457 | 396 | 320 | 63% |
| Fabric A PLUS (Fabric A with Dispersion Applied) | 723 | 653 | 629 | 602 | 542 | 453 | 63% |
| % Increase in Force due to the applied Dispersion | 43% | 32% | 30% | 32% | 37% | 41% | |

Example 8: Aqueous Polyurethane Dispersion Containing DMAMP

An aqueous polyurethane dispersion was prepared using DMAMP and EDA as neutralizers instead of TEA, according to the compositional makeup shown in Table 26.

TABLE 26

| Example 80 | |
|---|---|
| NCO/OH Ratio | 1.6000 |
| % NCO Aim | 2.9717 |
| Meq Acid/kg CG | 185.0 |
| Meq Monol/kg CG | 0.00 |
| Capped Glycol Recipe, Batch Wt, g | 1200 |
| T-1800 Glycol, g | 873.37 |
| PICM, g | 296.86 |
| DMPA, g | 29.78 |
| Hexanol, g | 0.00 |
| Catalyst, mg | 120 (K-KAT 640) |
| Capping Temp., ° C. | 90 |
| Capping Time, min | 90 |
| FBV Measured | 150 |
| Dispersion Recipe | |
| Capped glycol dispersed, g | 750.00 |
| DI Water, g | 1100.00 |
| Dowfax 2A1, g | 23.00 |
| DMAMP, g | 20.33 |
| BYK 012, g | 2.30 |
| Silicone 65, g | 0.00 |

TABLE 26-continued

| Example 80 | |
|---|---|
| EDA, g | 7.97 |
| Thickener, g | 18.00 |
| Irganox 245, g | 11.00 |
| Total Weight, g | 1932.60 |
| Calculated Total Solids, wt % | 41.62 |

The film properties of Example 80 were tested. The results are shown below in Tables 27 and 28 also with the film properties for Examples 60, 62, 63 and 64 (also shown above in Tables 23 and 24).

TABLE 27

| Part | NCO/OH Ratio | Meq Acid/kg CG | 1TP100 (g/den) | 1TP200 (g/den) | 1TP300 (g/den) | 5TP100 (g/den) |
|---|---|---|---|---|---|---|
| Ex. 80 (DMAMP) | 1.600 | 185.0 | 0.0314 | 0.0446 | 0.0717 | 0.0145 |
| Ex. 63 | 1.500 | 185.0 | 0.0223 | 0.0300 | 0.0420 | 0.0144 |
| Ex. 60 | 1.600 | 185.0 | 0.0266 | 0.0380 | 0.0592 | 0.0164 |
| Ex. 62 | 1.800 | 185.0 | 0.0354 | 0.0530 | 0.0911 | 0.0189 |
| Ex. 64 | 1.900 | 185.0 | 0.0394 | 0.0605 | 0.1311 | * |

*Film stripes were broken before completing the 5 stretch cycles of 0-300%.

TABLE 28

| Part | 5TP200 (g/den) | 5TP300 (g/den) | DEC (%) | TM2 (g/den) | TM1 (g/den) | ELO (%) | TEN (g/den) | SET (%) |
|---|---|---|---|---|---|---|---|---|
| Ex. 80 (DMAMP) | 0.0233 | 0.0390 | 24.44 | 0.0122 | 0.0069 | 542.20 | 0.2247 | 34.48 |
| Ex. 63 | 0.0214 | 0.0307 | 16.34 | 0.0144 | 0.0094 | 522.80 | 0.1810 | 21.84 |
| Ex. 60 | 0.0251 | 0.0397 | 20.00 | 0.0156 | 0.0104 | 494.83 | 0.2191 | 21.57 |
| Ex. 62 | 0.0306 | 0.0585 | 24.83 | 0.0171 | 0.0107 | 406.67 | 0.1543 | 24.60 |
| Ex. 64 | * | * | * | * | * | * | * | * |

*Film stripes were broken before completing the 5 stretch cycles of 0-300%.

As evident from a review of Tables 27 and 28, films made using DMAMP have comparable improved tensile properties (higher load and unload power, higher tenacity) to films made using TEA.

As those skilled in the art will appreciate, numerous changes and modifications may be made to the embodiments described herein, without departing from the spirit of the disclosure. It is intended that all such variations fall within the scope of the invention.

What is claimed is:

1. An article comprising:
   (a) one or more sections of fabric, wherein each section of fabric has a stress profile; and
   (b) one or more films adhered to one or more sections of fabric to form a fabric laminate having an altered stress profile,
   wherein each film comprises a dried aqueous polyurethane dispersion comprising a prepolymer, the prepolymer comprising:
   a glycol,
   an aliphatic diisocyanate and
   a diol,
   wherein a ratio of isocyanate groups in the aliphatic diisocyanate to hydroxy groups in the glycol and the diol (NCO/OH) is about 1.30 to about 2.20 and wherein a concentration range of carboxylic acid groups in milliequivalent per kg of prepolymer (Meq Acid/kg CG) is about 140 to about 250.

2. The article of claim 1, wherein the aliphatic diisocyanate is 4,4'-methylene bis (cyclohexyl isocyanate).

3. The article of claim 1, wherein the glycol is a poly (tetramethylene ether) glycol.

4. The article of claim 1, wherein the dial is DMPA.

5. The article of claim 1, wherein the ratio of isocyanate groups to hydroxy groups is about 1.40 to about 2.00.

6. The article of claim 1, wherein the ratio of isocyanate groups to hydroxy groups is about 1.50 to about 1.90.

7. The article of claim 1, wherein the concentration range of carboxylic acid groups in milliequivalent per kg of prepolymer is about 150 to about 220.

8. The article of claim 1, wherein the concentration range of carboxylic acid groups in milliequivalent per kg of prepolymer is about 155 to about 220.

9. The article of claim 1, wherein the prepolymer further comprises a monofunctional alcohol.

10. The article of claim 9, wherein the monofunctional alcohol is 1-hexanol.

11. The article of claim 1, wherein article is a body-shaping garment or a performance-enhancing garment.

12. The article of claim 1, wherein said altered stress profile includes a uniform distribution of stress and/or pressure.

13. The article of claim 1, wherein said altered stress profile provides a stress and/or pressure gradient to provide support at one or more areas within said fabric laminate.

14. The article of claim 13, wherein the altered stress profile provides a performance enhancing property.

15. The article of claim 1, wherein said film includes one or more layers of the film.

16. The article of claim 1, wherein said film has the same shape as said fabric section and is geometrically inverted.

17. The article of claim 1, wherein said fabric section comprises a trapezoid having a wide end and a short end;
   wherein said film also has a wide end and a short end; and
   wherein said short end of the film is placed corresponding to said wide end of the fabric section and said wide end of the film is placed corresponding to said short end of the fabric section.

18. The article of claim 1, wherein said film comprises a narrow strip;
   wherein said fabric section has a top portion, an intermediate portion and a bottom portion; and
   wherein said film is adjacent to two or more portions of said fabric section.

19. The article of claim 1, wherein said film comprises a narrow strip;
   wherein said fabric section has a top portion, an intermediate portion and a bottom portion; and
   wherein said film is oriented on said fabric section along a diagonal from the top of the fabric section to the bottom of the fabric section.

20. The article of claim 18, wherein said film is oriented along a diagonal or is perpendicular to the top portion or the bottom portion of the fabric section.

21. The article of claim 18, wherein said film is non-linear.

22. The article of claim 1, having improved whiteness retention as compared to articles containing an aromatic isocyanate measured as a reduction in CIE whiteness index value of about 30% to about 40% after exposure to about 195° C. for about five minutes.

23. The article of claim 1, having improved whiteness retention as compared to articles containing an aromatic isocyanate measured as a reduction in CIE whiteness index value of less than about 2% after UV exposure for about 8 hours.

24. The article of claim 1, having improved whiteness retention as compared to articles containing an aromatic isocyanate measured as a reduction in CIE whiteness index value of less than about 5% after exposure to $NO_2$ for about 24 hours.

25. The article of claim 1, wherein the article has improved whiteness retention where the film has been applied.

26. The article of claim 1, wherein the article is a brassiere having a wing portion, said wing portion including the film in the form of a narrow strip or geometrically inverted to said wing portion.

27. The article according to claim 26, wherein the film is continuous and in the form of a narrow strip that is oriented along a diagonal within or to edges of said wing portion.

28. The article according to claim 26, wherein the film is continuous and in the form of a narrow strip that is perpendicular to an edge of said wing portion.

29. The article of claim 1, wherein the article is a brassiere or bralette having a wing portion, and wherein the film extends as a continuous sheet across the whole of the wing portion.

30. The article of claim 1, wherein the article is swimwear, active wear or a shaper.

31. The article of claim 30, wherein the film extends across a bust, belly, thigh, seat, or any combination thereof of the article.

32. The article of claim 30, wherein the fabric laminate has improved chlorine resistance where the film has been applied.

33. The article of claim 32, wherein the article remains intact and maintains a substantially constant altered stress profile after exposure to a chlorinated environment for about 60 hours.

* * * * *